(12) United States Patent
Bullen

(10) Patent No.: US 6,292,712 B1
(45) Date of Patent: Sep. 18, 2001

(54) COMPUTER INTERFACE SYSTEM FOR A ROBOTIC SYSTEM

(75) Inventor: George Nicholas Bullen, Oxnard, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/016,797

(22) Filed: Jan. 29, 1998

(51) Int. Cl.⁷ .................................................. G06F 19/00
(52) U.S. Cl. ................... 700/245; 700/17; 901/3
(58) Field of Search ............................. 700/17, 245, 264, 700/246, 253, 257; 901/3, 4, 5

(56) References Cited

U.S. PATENT DOCUMENTS

| | | | |
|---|---|---|---|
| 3,576,540 | 4/1971 | Fair et al. ........................ | 192/346.1 |
| 4,249,243 | 2/1981 | Yoshida et al. ................... | 318/569 |
| 4,812,125 | * 3/1989 | Strashun ........................... | 434/224 |
| 4,831,548 | * 5/1989 | Matoba et al. ................... | 395/99 |
| 4,869,813 | 9/1989 | Bailey et al. ..................... | 706/906 |
| 4,965,742 | 10/1990 | Skeirik ............................ | 73/152.03 |
| 4,998,050 | * 3/1991 | Nishiyama et al. .............. | 395/83 |
| 5,038,089 | * 8/1991 | Szakaly ............................ | 701/23 |
| 5,305,836 | 4/1994 | Holbrook et al. ................ | 700/240 |
| 5,423,023 | 6/1995 | Batch et al. ...................... | 700/240 |
| 5,437,882 | 8/1995 | Greer et al. ...................... | 700/240 |
| 5,488,689 | * 1/1996 | Yamato et al. ................... | 700/264 |
| 5,621,662 | 4/1997 | Humphries et al. .............. | 700/17 |
| 5,889,670 | * 3/1999 | Schuler et al. ................... | 700/83 |
| 5,984,503 | * 11/1999 | Strickland et al. ............... | 318/569 |

* cited by examiner

*Primary Examiner*—William Grant
*Assistant Examiner*—Kidest Bahta
(74) *Attorney, Agent, or Firm*—Terry J. Anderson; Karl J. Hoch, Jr.

(57) ABSTRACT

The present invention is an interactive multi-media interface system which incorporates text, audio, and video graphics animation and other tools to interface a user with a device in an outside environment, such as a robotic device, machining or other tool. The interface system includes a computer workstation to allow inputs from a user, such as a machine operator, computer memory, and an interface computer program operating on the computer. The computer has a graphical user interface for interfacing the operator with the workstation and to allow interactive operation and control of the machine tool. The operator can provide inputs to the interface system by various input devices such as a keyboard, cursor, mouse, a stylus pointing device or a touch sensitive screen. The interface software shares access to and exchanges data with the computer memory.

39 Claims, 26 Drawing Sheets

| FIG. 3A | FIG. 3B |

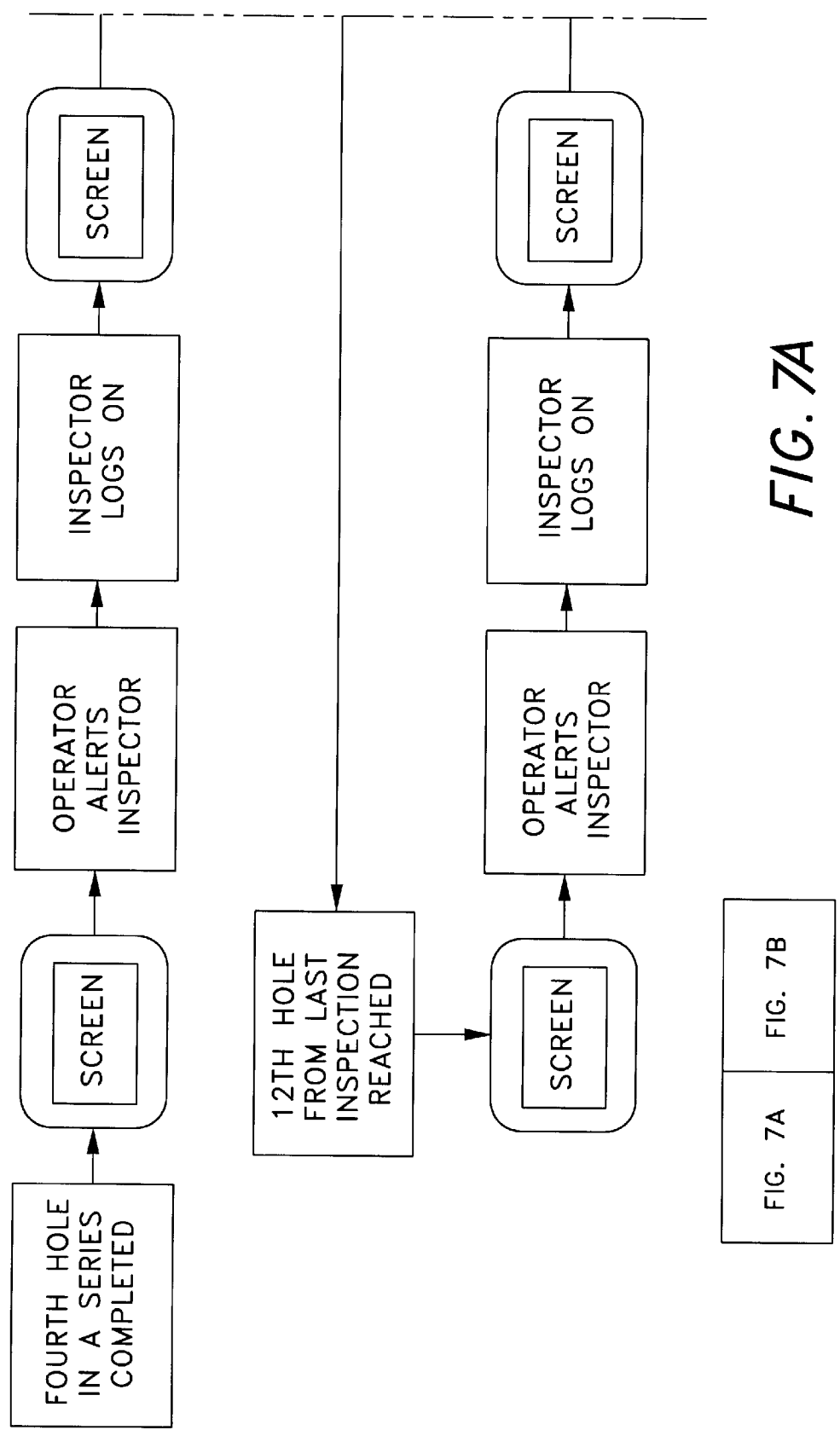

Northrop Grumman
EGADS
Interface Software

CYCLE STOP

PART NUMBER: 74A231511

SERIES STATUS

| HOLE SIZE | .1900 |
| --- | --- |
| MATERIAL | |
| HOLE # | 285 |
| HOLES IN SERIES | 8 |
| # OF HOLES COMPLETED | 8 |
| % OF HOLES COMPLETED | 250 |
| DRILL RATE | |

SERIES STATUS

| TIME TO NEXT INSPECTION | |
| --- | --- |
| TIME TO SERIES COMPLETION | |
| TIME TO SHIFT CHANGE | |

ASSEMBLY STATUS

| TOTAL HOLES | |
| --- | --- |
| TOTAL HOLES COMPLETED | |
| % OF HOLES COMPLETED | |
| DRILL RATE | |

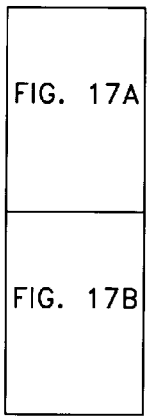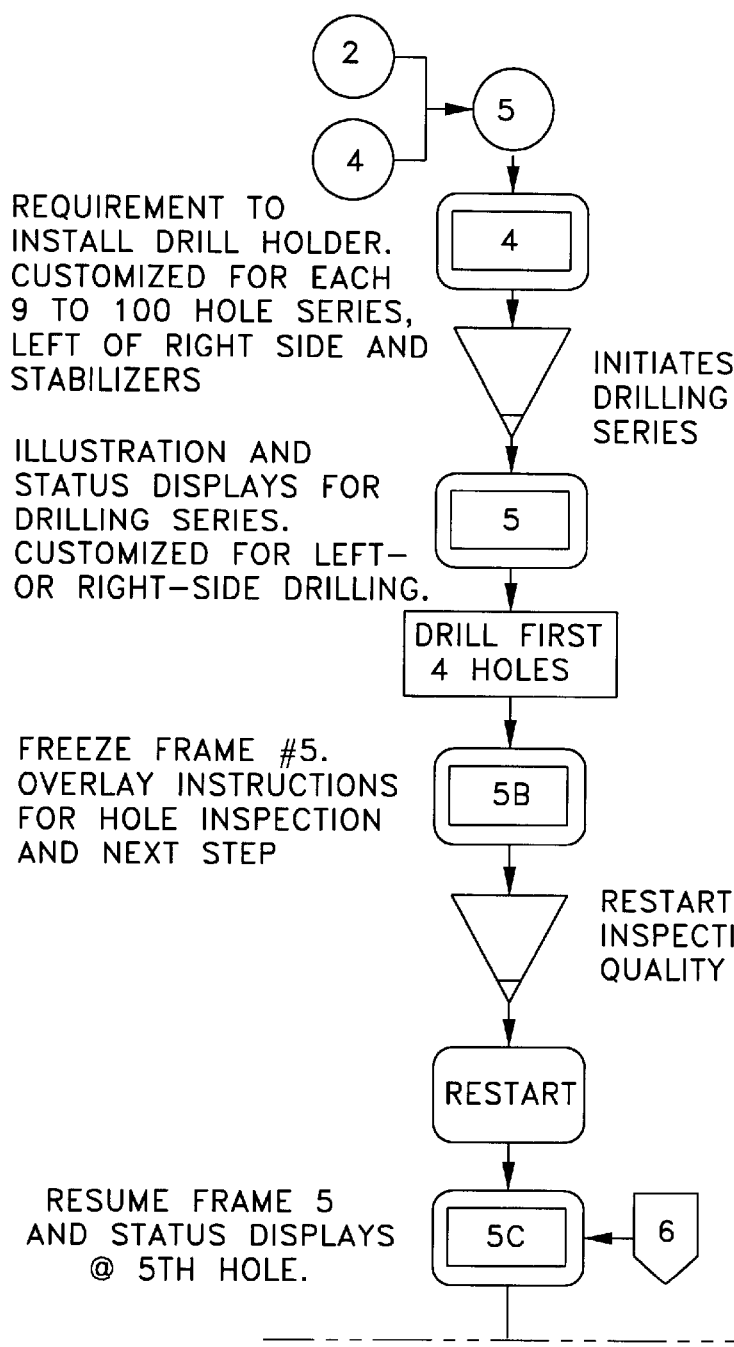

COMPUTER INTERFACE SYSTEM FOR A ROBOTIC SYSTEM

BACKGROUND OF THE INVENTION

1. Field of the Invention

This invention relates to interactive computer-based interface systems. More particularly, this invention relates to multi-media application software operating on a computer comprised of text, audio, video and computer graphics animation for interfacing an operator with an operable device, such as a robotic device, machining tool or other automatic tool in an environment outside the computer.

2. Related Art

Operation of a numerically controlled (NC) robotic system or machine tool can be a difficult and complex process. NC machine tools must be preprogrammed with custom settings and configurations that are specific to certain parts before the tool can perform any tooling operations. Also, operation of the NC machine tool, after initial settings are configured, requires constant complicated and esoteric monitoring and control by the operator. Consequently, not every machine tool operator can operate an NC machine tool. Instead, usually only tool operators with special required NC machine tool training can operate these NC machine tools.

Thus, current NC machine tools have several drawbacks. First, every operator that operates an NC machine tool must be extensively trained on complicated NC machine tool operation, NC machine tool computer programming and engineering part processing. This is an expensive and time consuming process. As such, most NC machine tools can be operated by only a very small number of operators. Next, even if a specially trained NC machine tool operator is used to operate and control an NC machine tool, the element of human error is still present. Even the best NC machine tool operator can make improper tool and part settings due to the complexity of the NC machine tool.

Therefore, what is needed is an interface system for allowing a person, such as a tool operator, to easily operate and monitor an NC machine tool automatically with easy to use and friendly user interfaces and controls. What is additionally needed is an interface system that has preprogrammable tool settings and part setting to thereby eliminate human error during part processing. What is further needed is an interface system that is preprogrammable for allowing a tool operator to perform less custom and configuration settings. Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is an interactive multimedia interface system which incorporates text, audio, video graphics, animation and other tools to interface a user (in the description that follows, the term user is used interchangeably with the term operator) with a device in an outside environment, such as a robotic system, which can include a machining or other tool.

The interface system includes a computer workstation to allow inputs from a user, such as a machine operator, computer memory, and an interface computer program operating on the computer (hereinafter, the term "interface system" will refer to the entire system, while the term "interface software" will refer to a software component of the "interface system"). The computer program has a graphical user interface for interfacing the operator with the workstation and to allow interactive operation and control of the robotic system. The operator can provide inputs to the interface system by various input devices such as a keyboard, cursor, mouse, a stylus pointing device or a touch sensitive screen. The interface computer program (interface software) shares access to and exchanges data with the computer memory. Thus, the entire robotic system can be interactively operated and controlled by an operator via the interface system of the present invention.

The interface system provides distributive attributes as well as interactive capabilities, such as instantaneous monitoring and control, while unique numerical controlled (NC) code relating to the particular robotic system and/or particular part is processed. As a result, continuous motion control interaction of the robotic system is possible through database management as well as through interactive graphics control using the graphical user interface. Moreover, the interface system of the present invention does not require operator input to determine motion control determinants and rules. Instead, the interface system of the present invention has built-in logic that adjusts in real-time or "on the fly" to variations in the conditions surrounding and affecting the motion of the robotic system.

Specifically, the graphical user interface includes a Main Menu area which allows the user to select a specific part to be assembled, machined, and/or processed by the robotic system. Once the specific part to be assembled, machined, and/or processed has been selected, a submenu requiring operator and part authorization must be completed. This submenu prevents unauthorized operation of the robotic system or machine tool as well as unauthorized machining of the specific part. A series of operation and monitoring menus are included to aid in preprogrammed machining operations of the parts and to provide monitoring of the NC machining tool, respectively. The graphical user interface is friendly and easy to use.

The interface system can additionally include a training system with training software operating on the computer for training the operator on how to operate the outside device. The training software comprises numerous interactive training tutorials for providing "hands on" realistic training to trainees. The training system can further include a remote station linked to the computer memory of the interactive computer. An instructor can be located at the remote station for monitoring and supervising the operator in real time. Moreover, the remote station can share access to and exchange data with the computer memory.

A feature of the present invention is the interactive software modules that allows real time operation and control of the outside devices. Another feature of the present invention is the easy to use and friendly graphical user interfaces and controls. Yet another feature of the present invention is the interface system that is preprogrammable for reducing the amount of custom and configuration settings that a tool operator must perform. An advantage of the present invention is that the interface system allows a person, such as a tool operator, to easily operate and monitor a robotic system or an NC machine tool automatically. Another advantage of the present invention is that the interface system controls part and tool settings, thereby eliminating erroneous human settings.

The foregoing and still further features and advantages of the present invention as well as a more complete understanding there of will be made apparent from a study of the following detailed description of the invention with the accompanying drawings and appended claims.

BRIEF DESCRIPTION OF THE DRAWINGS

Referring now to the drawings in which like reference numbers represent corresponding parts throughout:

FIGS. 9–14 illustrate sample layouts of the graphical user interface of the sample operations of FIGS. 9–11.

DETAILED DESCRIPTION OF THE PREFERRED EMBODIMENT

In the following description of the preferred embodiments of the present invention, reference is made to the accompanying drawings which are a part hereof, and which is shown by way of illustration specific embodiments in which the invention may be practiced. It is understood that other embodiments may be utilized and structural changes may be made without departing from the scope of the present invention.

General Overview of System Components

Figure 1A:
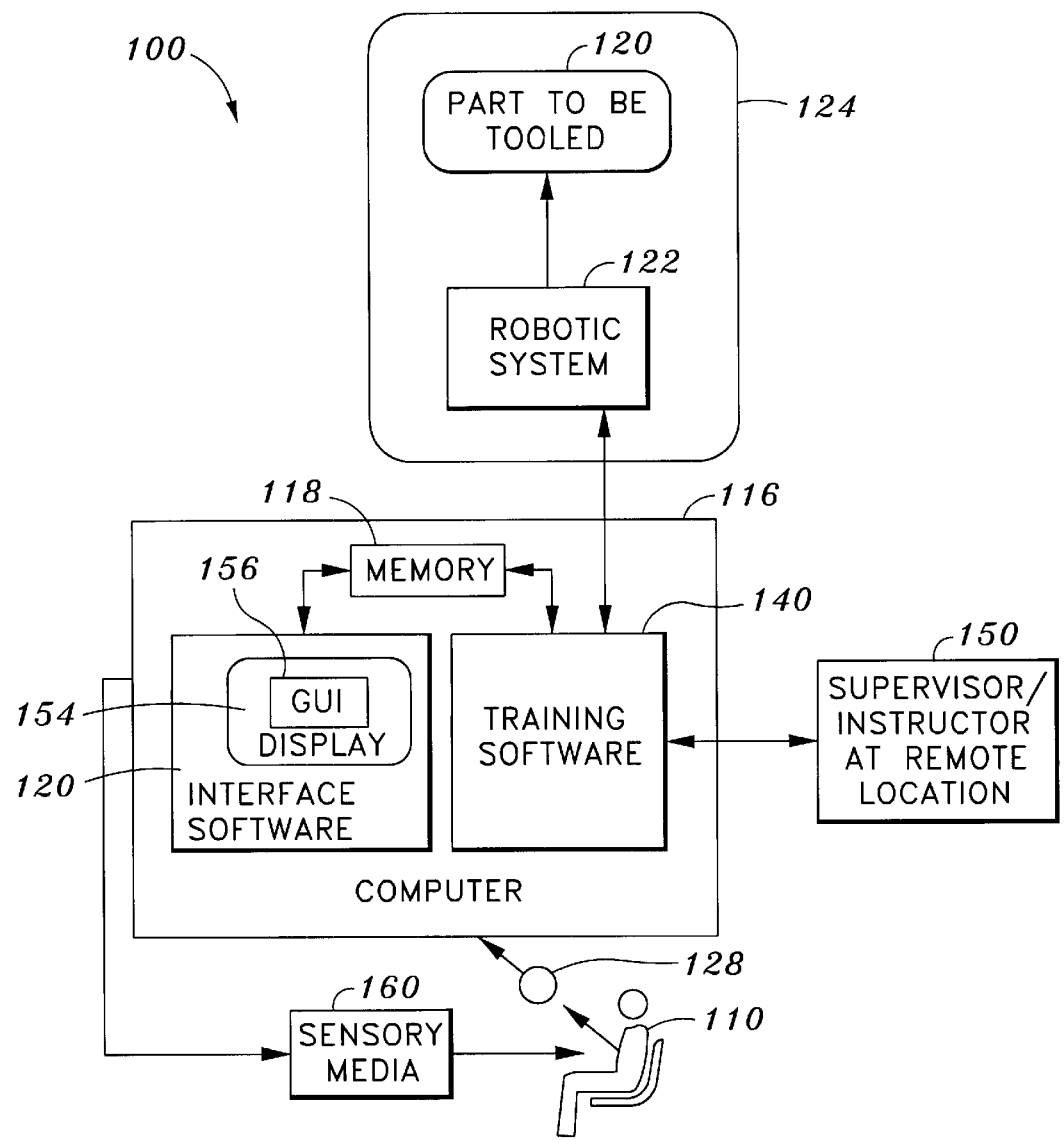
FIG. 1A is an overall view diagram of the present invention.

FIG. 1A is an overall block diagram of the present invention. The present invention is an interactive interface system 100 for providing a user 110, such as an operator, with an interactive computer environment 116 with a memory medium 118 and interface software 120 operating on the computer 116. The interface software 120 has access to and exchanges data with the memory medium 118 and is interfaced to an actual robotic system 122, such as a machine tool, of an outside situation or environment 124 for direct response and control of the environment 124. For example, the interface system 100 can assemble, machine, and/or process a part 126 by controlling the robotic system 122. The interface software 120 operates on the computer 116 for controlling the robotic system 122. One such robotic system is described in co-pending U.S. patent application Ser. No. 08/540,525 filed on Jun. 25, 1997, by the present inventor, Bullen, entitled NUMERICAL CONTROL MACHINE TOOL POSITIONING SYSTEM, which is incorporated herein by reference. Another robotic system used in the present invention can be the one described in co-pending U.S. patent application Ser. No. 08/834,148 filed on Apr. 14, 1997 by the present inventor, Bullen, entitled MOBILE GANTRY TOOL, which is incorporated herein by reference. Most commercially available robotic systems can incorporate the interface system 100 of the present invention.

The interface system 100 can also have training software 140 for training the operator 110 to perform specific tasks in the environment 124 outside of the computer 116. One such training system is described in co-pending U.S. patent application Ser. No. 08/858,037 filed on May 15, 1997, by the present inventor, Bullen, entitled MACHINING TOOL OPERATOR TRAINING SYSTEM, which is incorporated herein by reference. For example, the training software 140 can teach the operator 110 to assemble, machine, and/or process the part or workpiece 126 with the robotic system 122 by responding to inputs 128 by the operator 110. The training software 140 analyzes and processes the input 128 and responds appropriately with information in the form of training feedback. The user's input 128 can be stored in the computer memory 118.

Also, the training system 140 can further include a remote station 150 linked to the computer memory 118 of the interactive computer 116. The remote station 150 can have an instructor for monitoring and supervising the operator 110 in real time. Moreover, the remote station 150 can share access to and exchange data with the computer memory 118. The remote station 150 can be linked to the computer 116 in any suitable networking manner, such as via an intranet or internet connection.

The computer 116 of the interface system 100 is preferably a workstation, such as a windows-based personal computer or a UNIX computer workstation. The workstation 116 includes a primary display 154 which incorporates a graphical user interface 156 of the interface software 120. This graphical user interface 156 varies depending on operator input. The interface software 120 is an event driven program. Since the interface software 120 is event driven, the graphical user interface 156 constantly calls functions and sends messages to the interface software 120 to indicate that some event has occurred. This allows the interface software 120 to directly respond to data and input from the operator 110. The events can include cursor movement, keystrokes, mouse movements, stylus pointing device movements, or touch screen actions from the operator 110. Also, the interface software 120 includes sensory media 160 associated with actual robotic actions/machine tooling events for interactively involving the operator 110 in the control and operation of the robotic system 122.

General Overview of System Operation

Figure 1B:
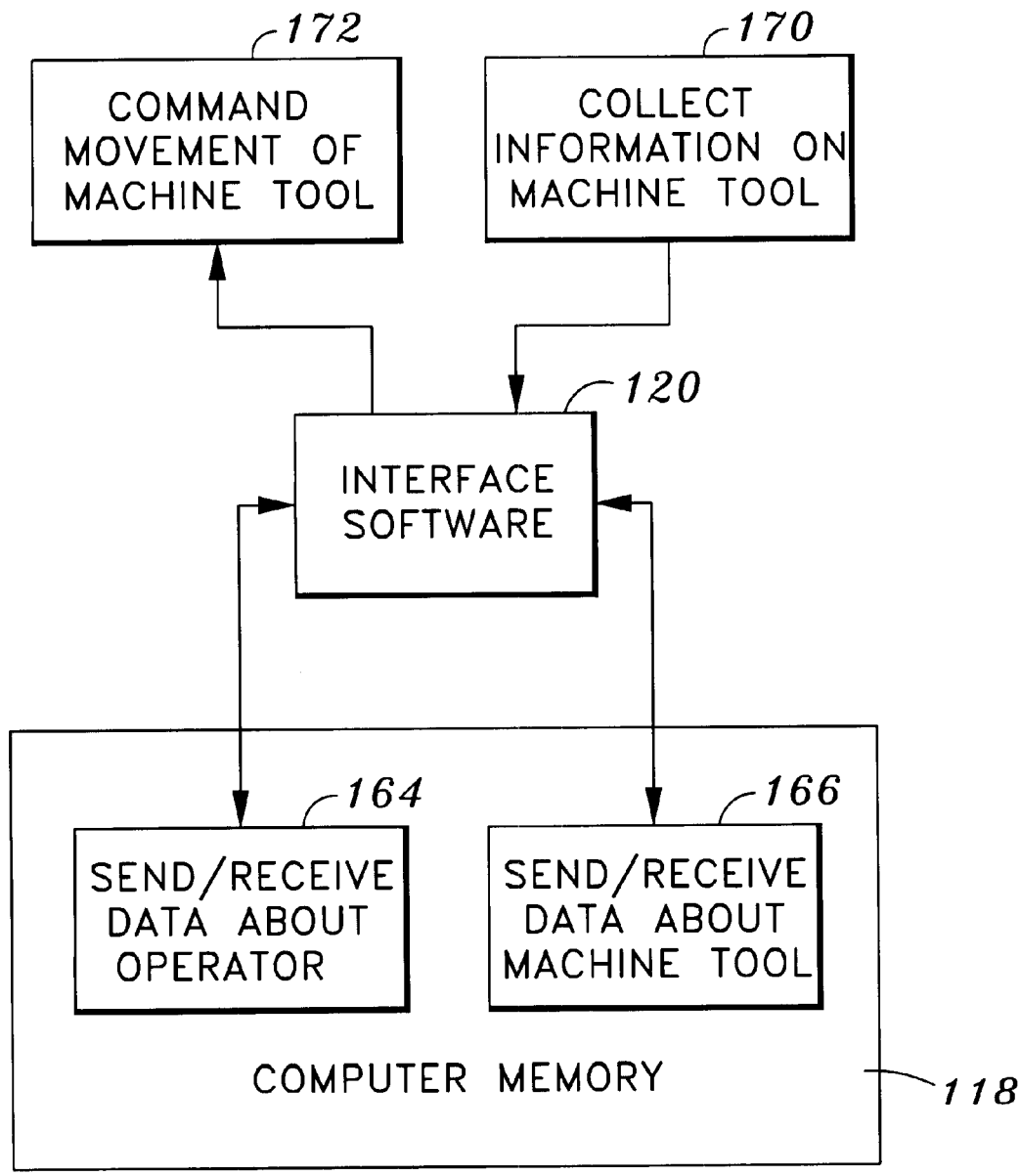
FIG. 1B is a block diagram of the operation of the interface software with the robotic device.

FIG. 1B is a block diagram of the operation of the interface software with the robotic system or machine tool. Referring to FIG. 1A along with FIG. 1B, the interface software 120 receives data in the form of, for example, operator data 164 and/or robotic/machine tool data 166, from the computer memory 118. This data can include preprogrammed commands and instructions for operating the robotic system 122 and/or history profiles of the operator's input to the training software 140. The interface software 120 also receives instantaneous data 170 from the robotic system 122, which can include data indicating the robotic system's 122 position, location, status, etc. The interface software 120 instantaneously processes all data received and sends suitable commands 172 to the robotic system 122 for operating the robotic system 122 in real time.

For instance, in its preferred embodiment, the memory 118 stores information defining the robotic system 122 including data defining various geometrical aspects (such as, for example, drill bit sizes or tool sizes, tool or drill bit motion limits, drill bit offset values, workpiece jig position range). The interface software 120 interprets such information stored in the memory 118 to give meaning to a movement by the operator 110 of the input device 128 as corresponding to a computer-controlled repositioning of the drill bit or a computer-commanded change in the drill bit velocity, for example. The interface software 120 further interprets such information from the input device 128 in light of the machine-defining information in the memory 118 and in view of a history machine movements thus commanded by the operator 110 to determine the present state or position of each element (e.g., the drill bit and the workpiece) of the robotic system 122 and furthermore infer from such a history the nature of the operation being performed by the operator 110.

The interface software 120 provides distributive attributes as well as interactive capabilities, such as instantaneous monitoring and control, while the numerical control (NC) code relating to the robotic system 122 and/or particular part 126 is processed. As a result, continuous motion control interaction of the robotic system 122 is possible through database management as well as through interactive graphics control using the graphical user interface 156. Moreover, the interface software 120 of the present invention does not require operator 110 input to determine motion control determinants and rules. Instead, the interface software 120 of the present invention has built-in logic that adjusts in real-time or "on the fly" to variations in the conditions surrounding and affecting the motion of the robotic system.

With regard to the training software 140, the memory 118 further stores templates representing ideal machine operations, such as would be expected to be performed by an expert machine operator, including for example, drill bit spin rate (RPM), drill bit velocity (e.g., toward the workpiece) and so forth. The training software 140 can interpret such information stored in the memory 118 to give meaning to a movement by a trainee, as corresponding to a computer-controlled repositioning of the drill bit or a computer-commanded change in the drill bit velocity, for example. For purposes of this application, the term "engineering data" includes the following: Operator data 164; robotic/machine tool data 166; preprogrammed commands and instructions for the operating robotic system 122; history profiles of the operator's input to the training software 140; instantaneous data including data indicating the robotic system's position, location, status, etc.; information defining the robotic system 122 including data defining various geometric aspects such as, drill bit sizes, tool sizes, tool or drill bit motion limits, drill bit offset values, or piece jig position range; and data relating to history machine movements commanded by operator 110. The training software 140 further interprets such information from the input device 128 in light of the machine-defining information in the memory 118 and in view of a history machine movements thus commanded by the trainee to determine the present state or position of each element (e.g., the drill bit and the workpiece) of the robotic device 122 and furthermore infer from such a history the nature of the operation being performed by the trainee.

Moreover, the training software 140 infers the parameters of such an operation and compares them with the templates of the ideal operations stored in the memory 118 to determine how well the trainee is doing and to determine what kinds of errors he may be committing. (Such errors may include, for example, the trainee selecting such a high velocity of a drill bit through a workpiece that the drill bit or workpiece would be overheated in a real machine operation.) The training software 140 further considers all of the foregoing information to generate feedback to the trainee, such as a simulated image of the machine and workpiece illustrating in video the movements commanded by the trainee, and generating any error messages to the trainee or other helpful information of the type referred to in co-pending U.S. patent application Ser. No. 08/858,037 filed on May 15, 1997, by the present inventor, Bullen, entitled MACHINING TOOL OPERATOR TRAINING SYSTEM, which is incorporated herein by reference.

Sample Operation

Figure 2:
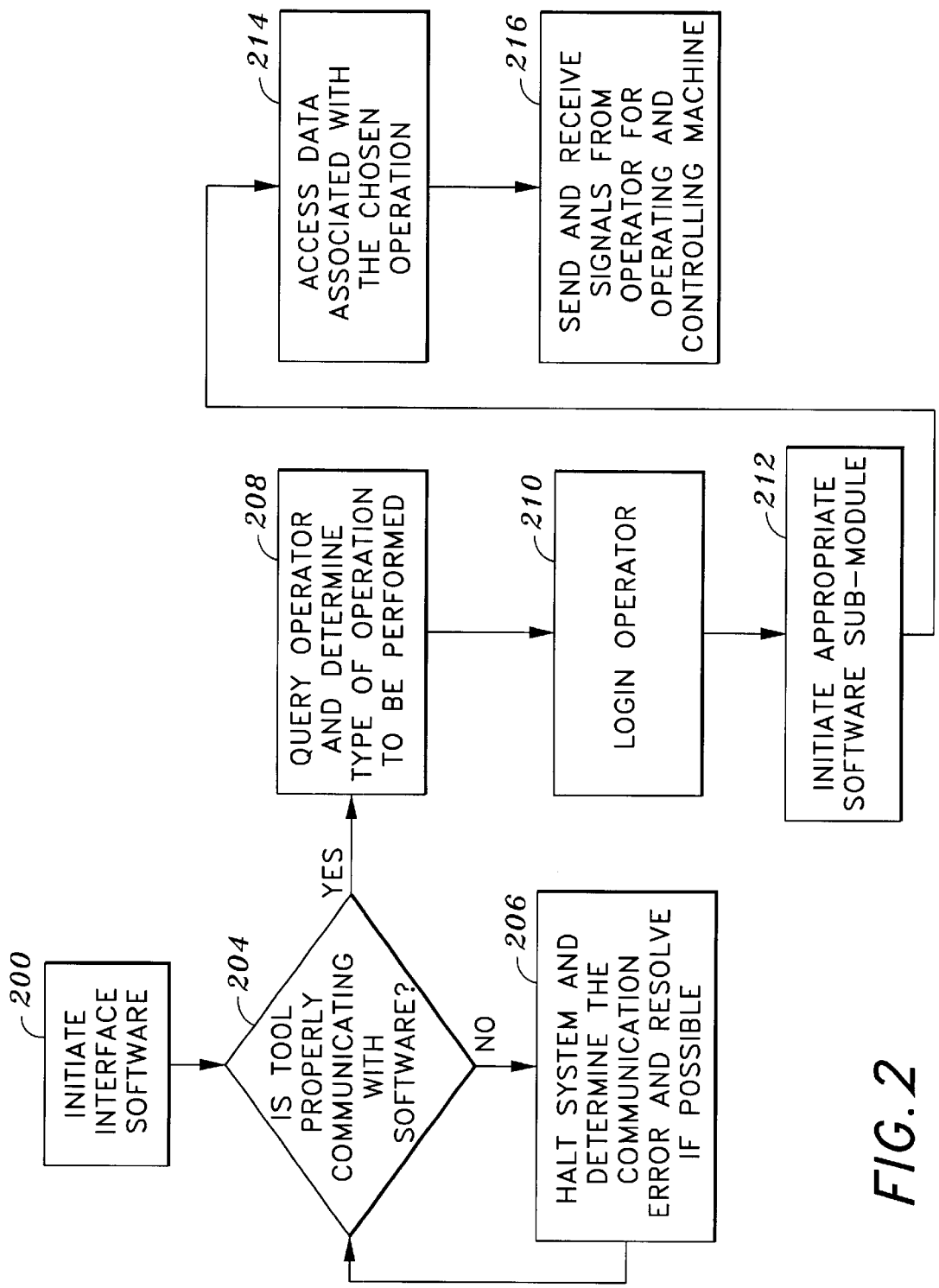
FIG. 2 is an overall illustration showing the general flow of the interface system of the present invention.

Referring to FIG. 2 along with FIG. 1A, FIG. 2 is an overall illustration showing the general flow of the interface software 120 of the interface system 100 operating on the workstation 116. First the interface software 120 is initialized 200. Second, the interface system 100 is checked 204 for proper communication between the tool 122 and the interface software 120. If the communication is not properly set, the system is halted until proper communication is properly set up 206. If the communication is properly set up, the type of operation to be performed is determined 208 by querying the operator 110. For example, tooling operations, system and tool maintenance, operator training, programming for data changes and updates, etc. can be chosen.

The system then performs a "login" operation 210, wherein the operator 110 logs into the system 100 with an identifying login name, such as a personal identification number, and/or a password. A software sub-module associated with the chosen operation to be performed initializes and initiates 212. For example, if training is chosen, the training software sub-module discussed above is initiated. If a tooling operation is chosen, a tooling operation sub-module is initiated and an option is given to choose a particular robotic system or machine tool and part available to be assembled, machined, and/or processed. Linked data, preprogrammed data or data stored in the computer's memory 118 associated with the particular operation is then accessed 214 and used to aid in performing the particular operation. Next, operation, control and indication signals are exchanged 216 between the robotic device 122, the interface software 120 and the operator 110 for performing the particular operation.

WORKING EXAMPLE

Overview of Components

Figures 3, 3A:
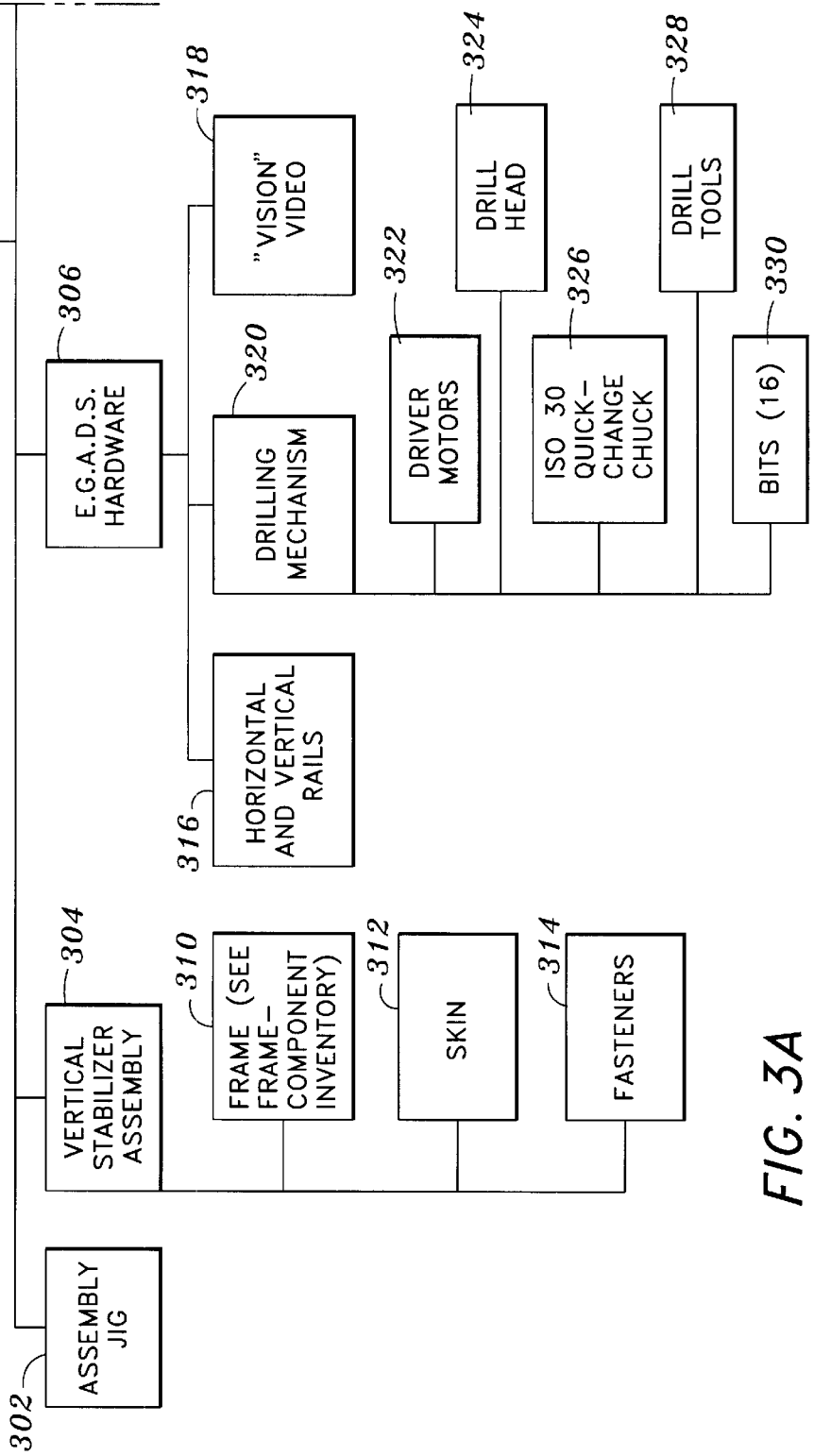
FIG. 3 is an architectural block diagram of a working example of the interface system of the present invention.
Figure 3B:
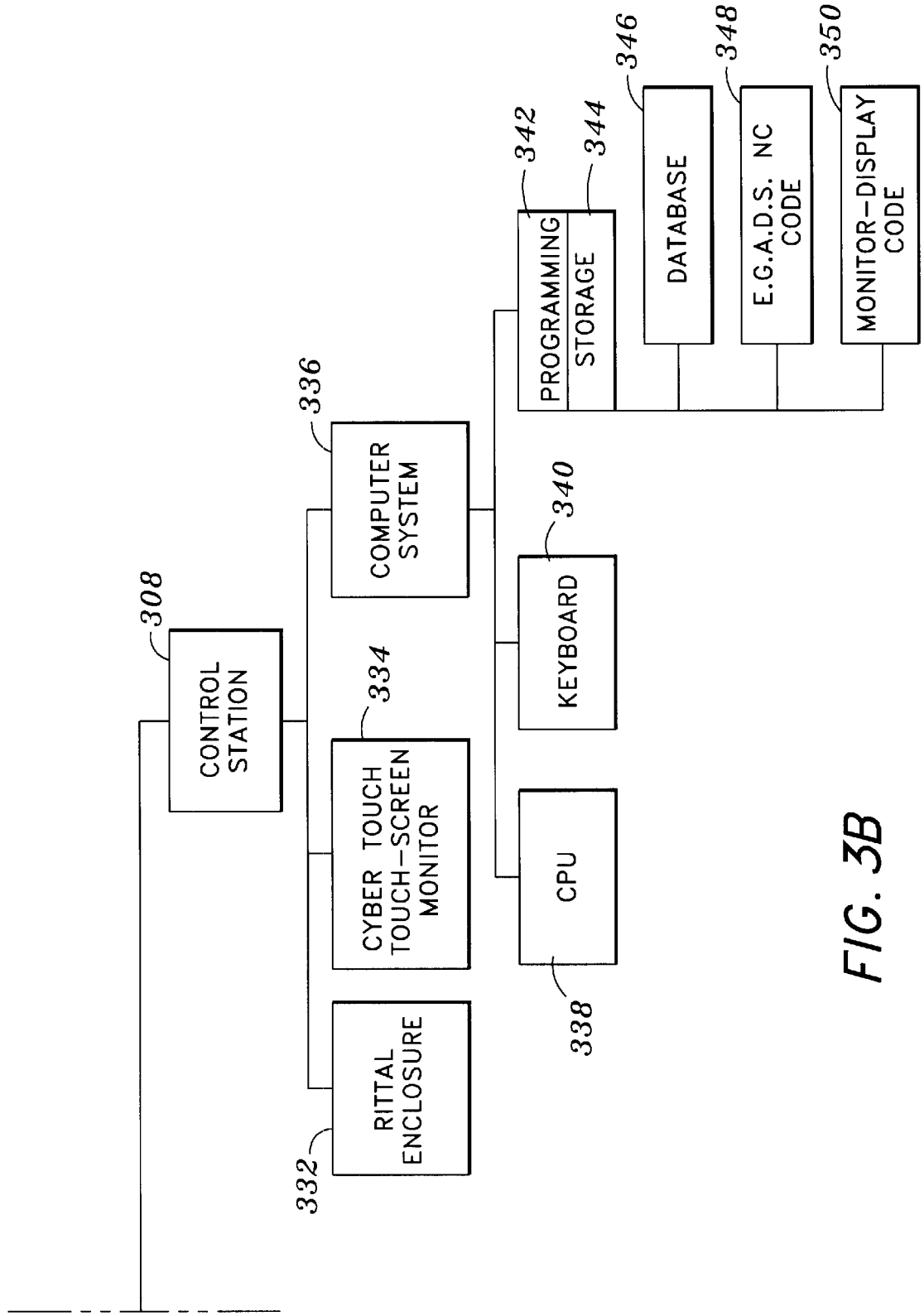

FIG. 3 is an architectural block diagram of a working example of the interface system of the present invention. In the following working example, the present invention is implemented in a gantry robotic device, such as the gantry device described in co-pending U.S. patent application Ser. No. 08/540,525filed on Jun. 25, 1997, by the present inventor, Bullen, entitled NUMERICAL CONTROL MACHINE TOOL POSITIONING SYSTEM, with an interface system for assembling a vertical stabilizer. The gantry robotic device with an interface system 300 includes four main components, an assembly jig 302, a vertical stabilizer assembly 304, a gantry device 306, and a control station 308. The assembly jig 302 is a jig for holding a part, such as the vertical stabilizer assembly 304. The vertical stabilizer assembly 304 is a part that comprises subassembly components, including a frame 310, a skin 312, and fasteners 314. These subassembly components are to be assembled by the gantry with the interface system 300.

The gantry device 306 is comprised of movement devices, such as horizontal and vertical rails 316, monitoring devices, such as a vision video system 318 with a mobile camera for viewing various portions of the robotic device as well as the part to be assembled, machined, and/or processed and processing devices, such as a drilling mechanism 320. The drilling mechanism 320 includes typical components such as drive motors 322, drill heads 324, change chucks 326, drill tools 328, and drill bits 330.

The control system 308 comprises a rittal enclosure 332, a functional monitor 334, such as a touch screen monitor (sample detailed components of the screen is discussed below in detail in FIGS. 9–14), and a computer system 336. The computer system 336 comprises a central processing unit (CPU) 338, an input device 340, such as a keyboard, mouse, trackball, and/or pointing device, system control code (software) 342, and a data storage memory device 344. The system control code 342 has a database 346 comprised of, for example, data associated with the gantry device and the parts to be processed, NC programming code 348 with accessible engineering data for coordinating processing parameters, and monitor-display programming code 350 for coordinating output and interactivity with the screen displays (components of the system control code are discussed in detail below).

Component Interaction

Figure 4:
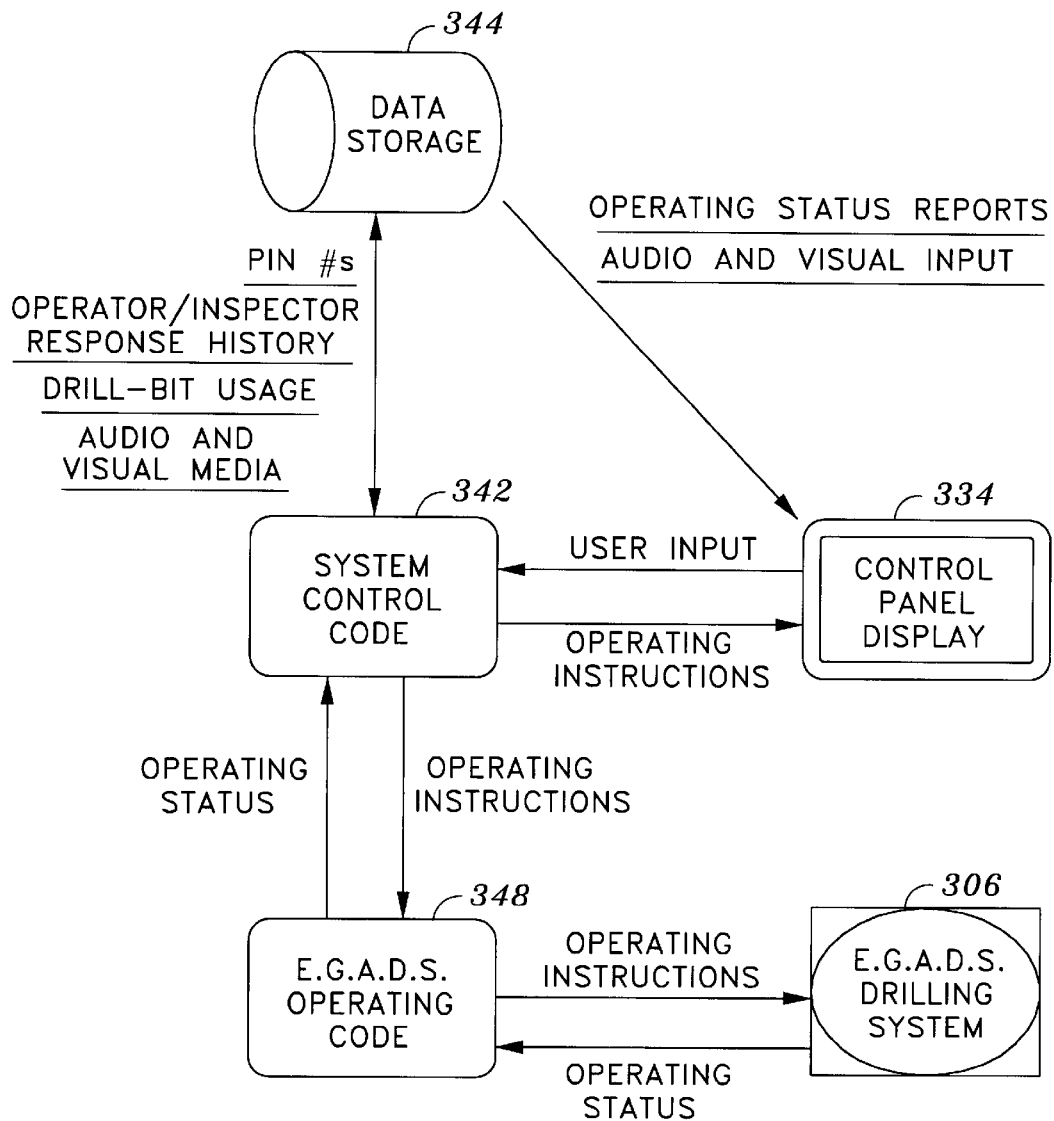
FIG. 4 is a block diagram illustrating general component interaction of the working example of the interface system of FIG. 3.

FIG. 4 is a block diagram illustrating general component interaction of the working example of the interface system of FIG. 3. The data storage device 344 of the control station 308 is coupled to the touch screen monitor 334 and the system control code 342. The data storage device 344 shares data such as operating status report data and audio visual input data with the touch screen monitor 334. The operating status report data includes information regarding the status of the gantry device 306 and the audio visual input data allows the screen to view data input to the system. The data storage device 344 shares database information, such as operator information (passwords, personal identification numbers, etc.) operator/inspector response history, drill bit usage, and audio and visual media data with the system control code 342.

The system control code 342 is coupled to the control panel display 334 and the NC programming code 348. The system control code 342 sends operator instructions to the control panel display 334 for review and response by the operator. The control code 342 also receives operator input, such as commands, queries, etc. from the operator via the control panel display 334. The system control code 342 sends operating instructions to the NC programming code 348 which processes the operating instructions and performs engineering calculations based on operating instructions.

The NC programming code 348 is coupled to the gantry device 306 for sending operating instructions to the gantry device 306 and for receiving operating status information from the gantry device 306. The NC programming code 348 sends operating status information of the gantry device 306 to the system control code 342 which processes this data and determines appropriate action, such as alerting the operator, automatically adjusting the gantry device, etc.

General Operation

Figure 5A:
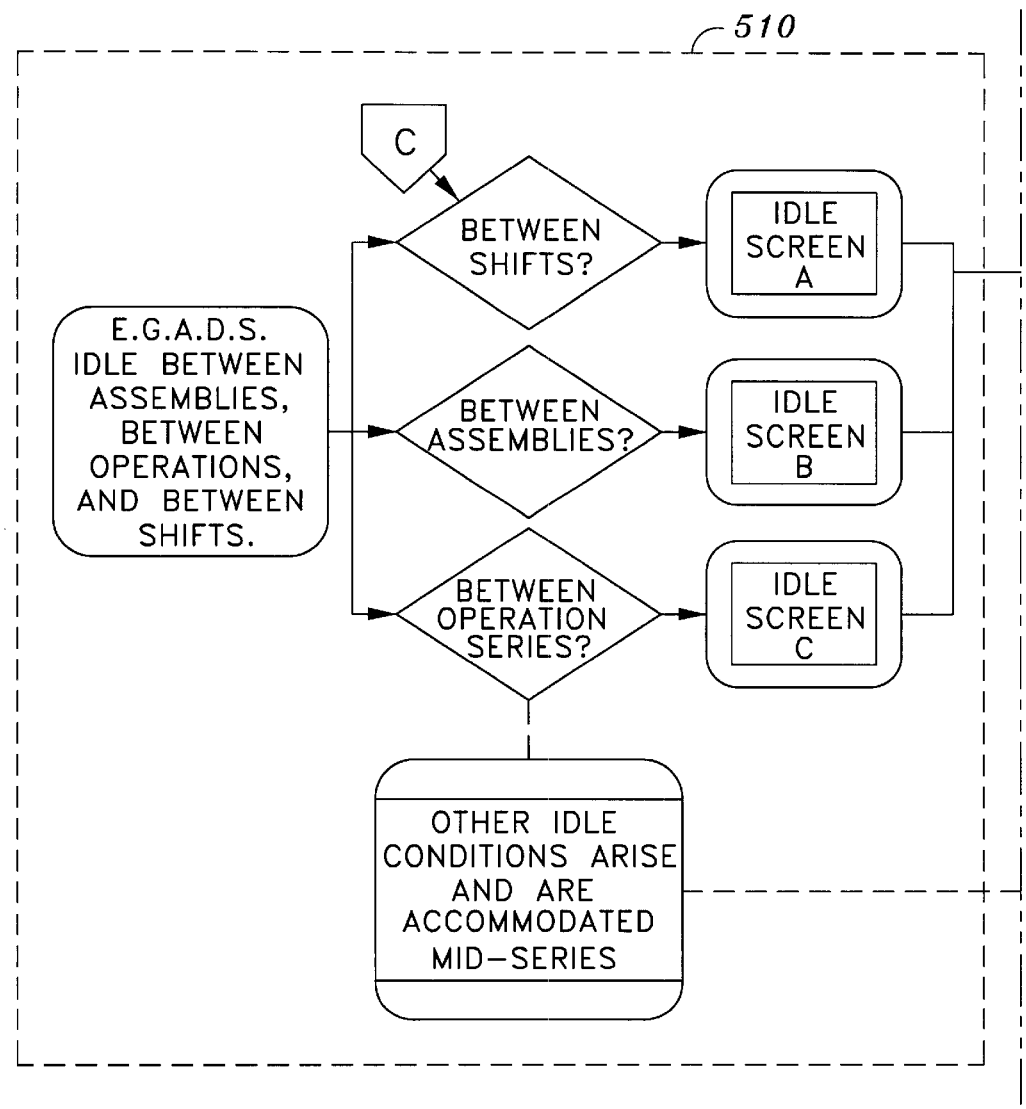
FIGS. 5A–5E illustrate general flow diagrams of the working example of the interface system of FIG. 3.
Figure 5:
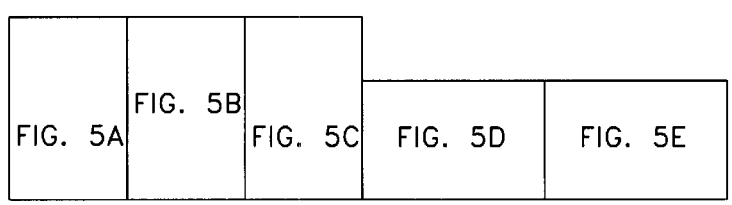
Figure 5B:
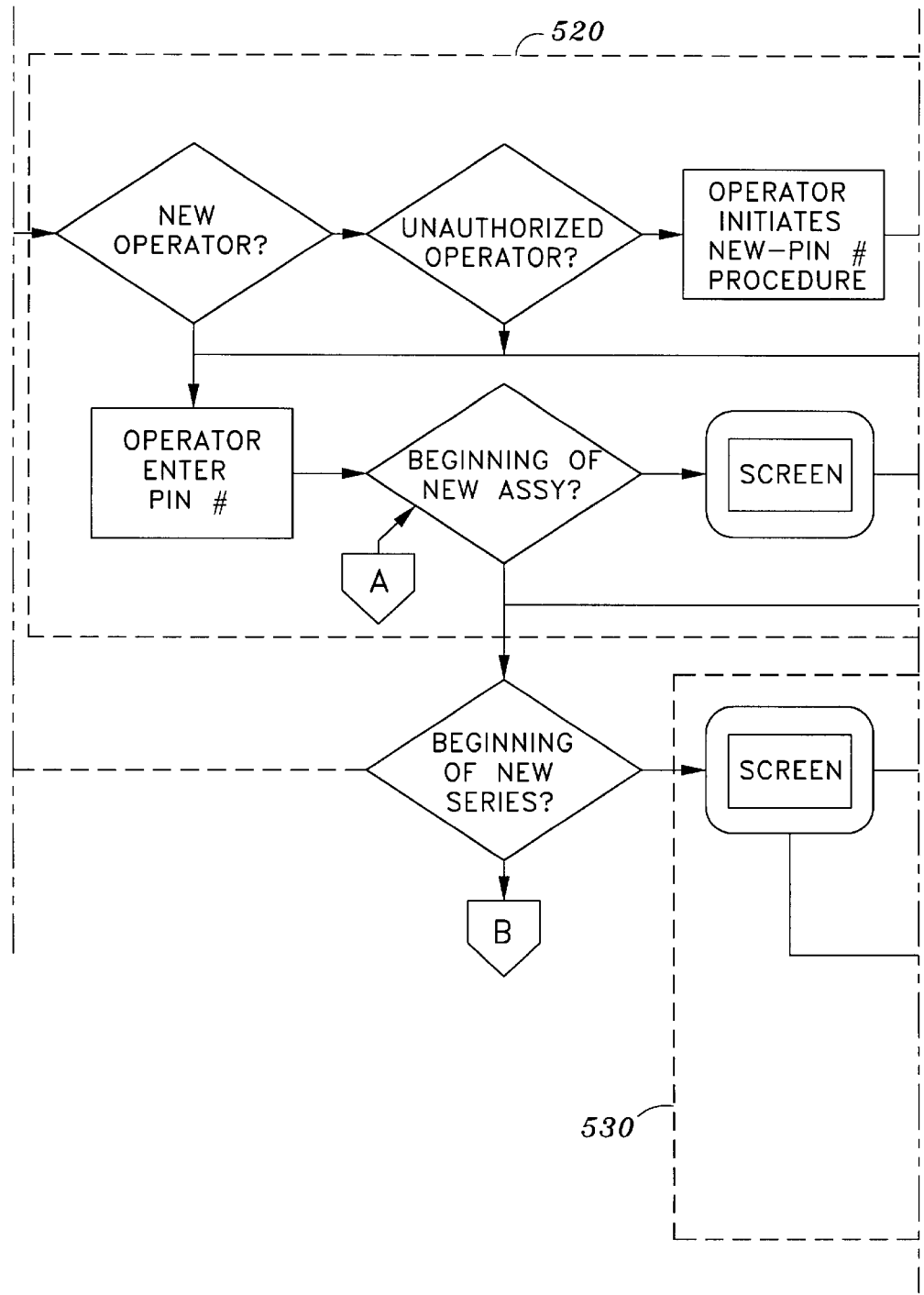
Figure 5C:
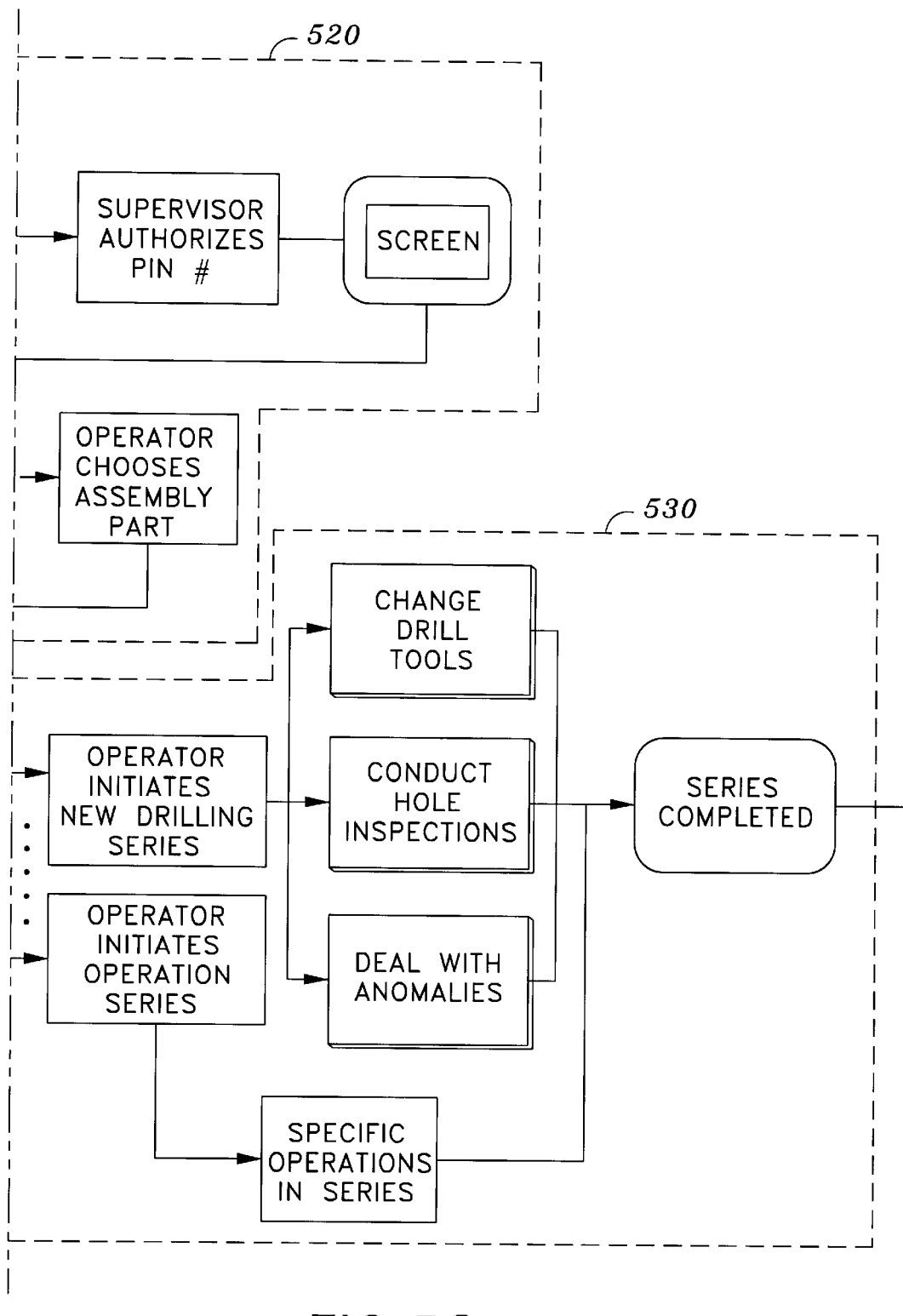
Figure 5D:
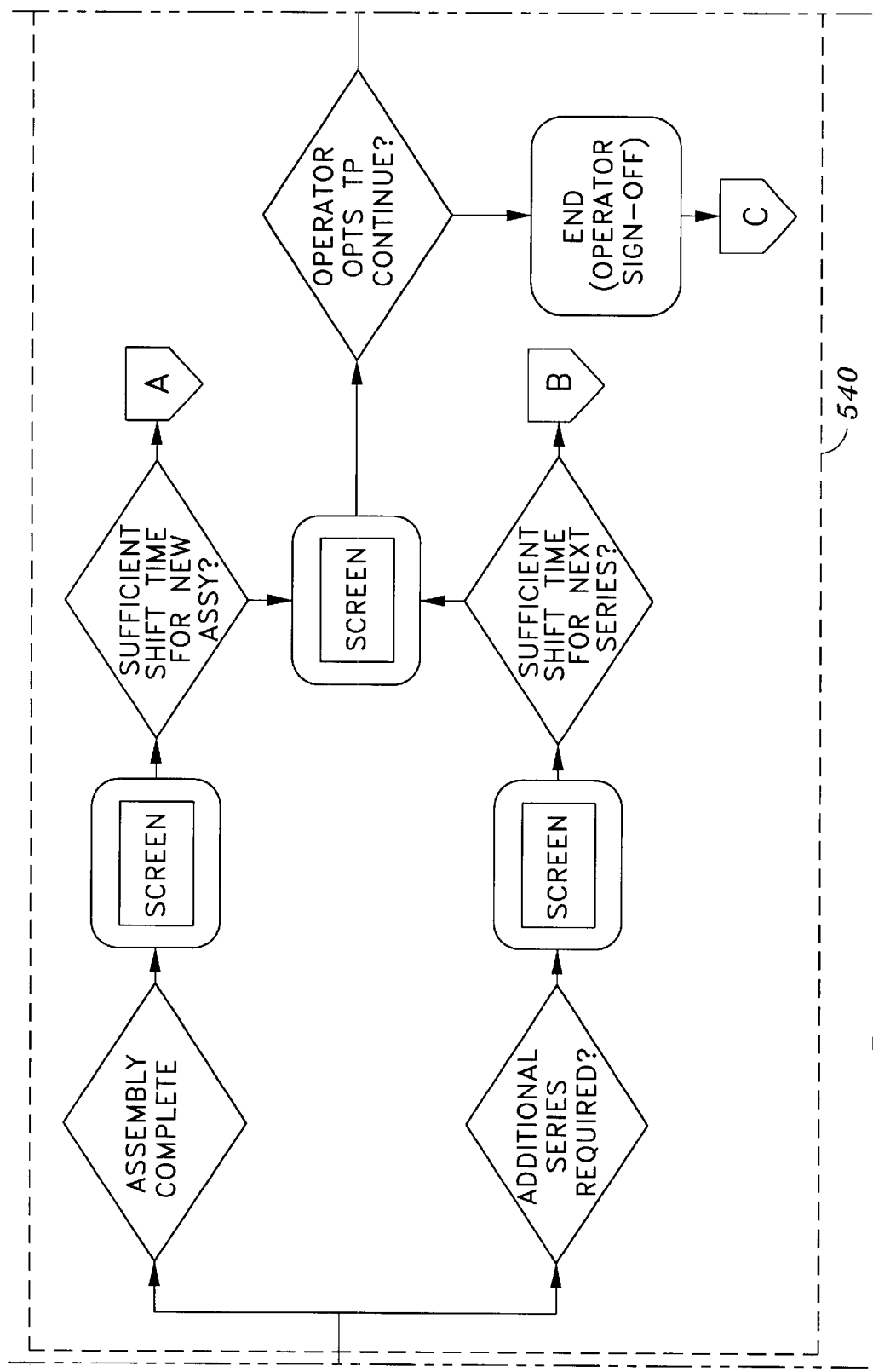
Figure 5E:
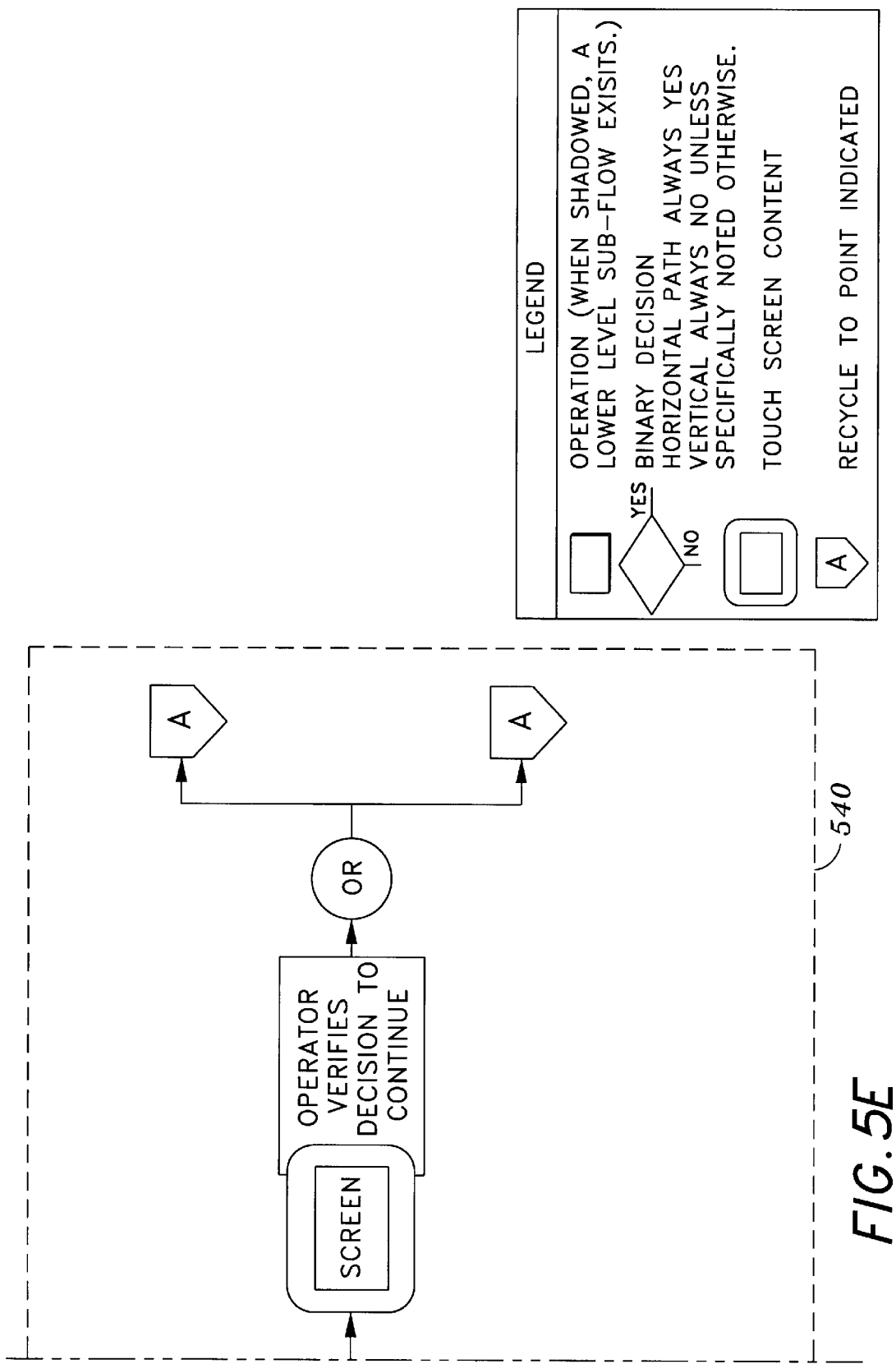

FIGS. 5A–5B illustrate general flow diagrams of the working example of the interface system of FIG. 3. The general operation of the interface system can be categorized into four major components: idle operation 510, operator login 520, gantry operation 530, and additional operations 540. The idle operation 510 component provides device management with computer screen displays on the monitor 334 during different idle states of operation, for example between shifts, between assemblies, or between gantry operation 15 series, as shown in FIG. 5A.

The operator login 520 component provides operator use management. a operator is given access to use the system only after properly logging into the system. For example, the operator can only log into the system with an identifying login name, such as a personal identification number, and/or a password, as shown in FIG. 5A.

The gantry operation 530 component provides gantry operation and control management. As discussed above, the interface system is preprogrammed with NC code with several operations that are performed by the gantry. The gantry operation 530 component provides the operator with an interactive interface to perform and monitor these operations. For example, at the beginning of an operation series, the operator initiates a new operation series and is given a choice of several specific operations that the gantry can perform, as shown in FIG. 5A.

The additional operations 540 component is used when the particular operation series of the gantry operation 530 component is complete. The additional operations 540 component provides general management, control, and monitoring of the system after a series of operations are complete. For example, the additional operations 540 component determines whether the assembly is complete or if additional series are required to complete the assembly, and whether there is sufficient shift time to start a new assembly. It also returns to other specific components, based on whether the operator decides to continue or to sign off. It should be noted that the system can be preprogrammed with time clock information or coupled to sign in/out employee time clocks so that the time to the end of a shift is tracked with beginnings and ends of shifts triggering decision-making by the operator.

Sample Operating Modules

Figures 6, 6A:
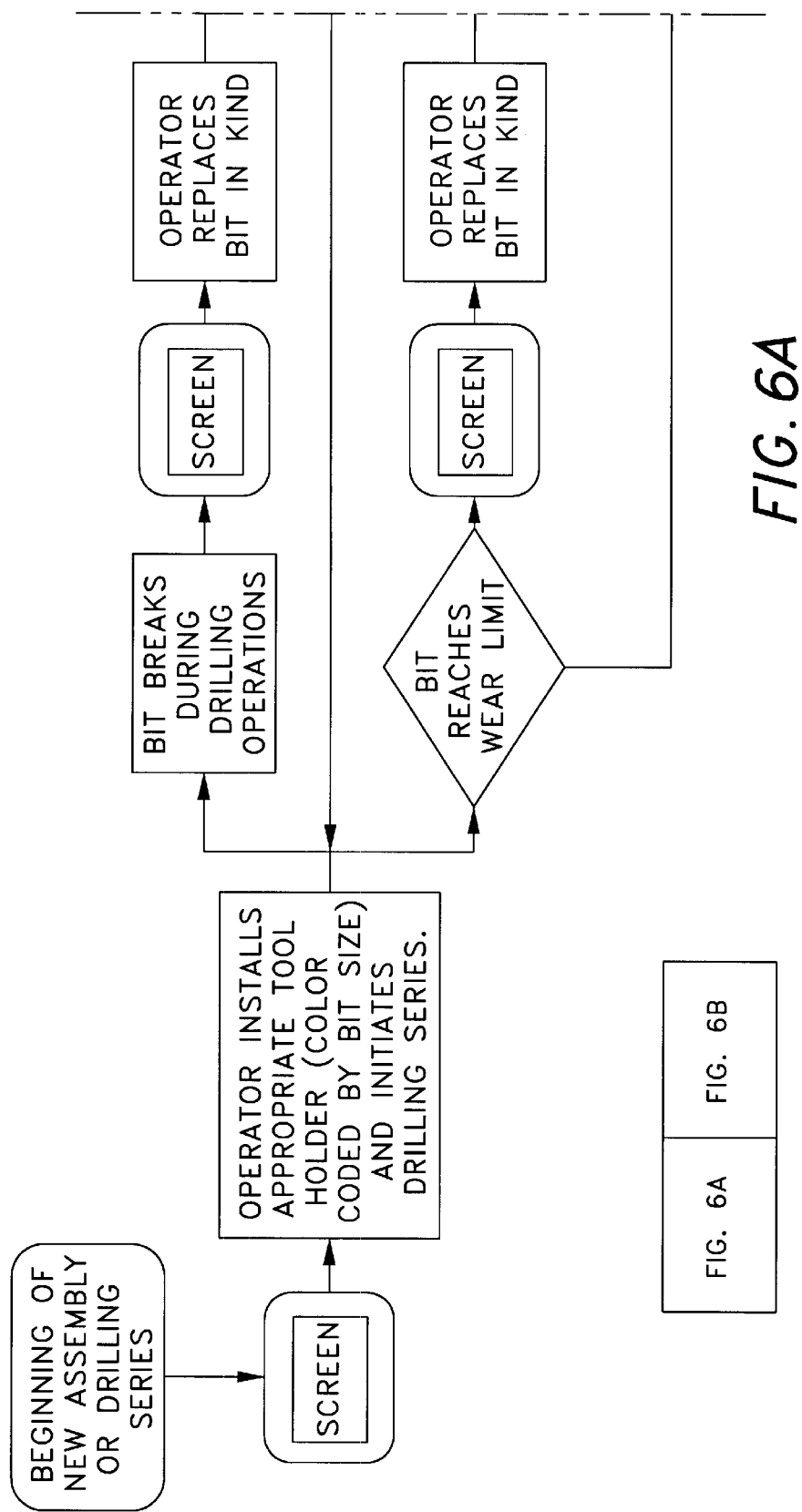
FIG. 6 is a detailed flow diagram of a first sample module of the working example of the interface system of FIG. 3 and of the components of FIG. 5.
Figure 6B:
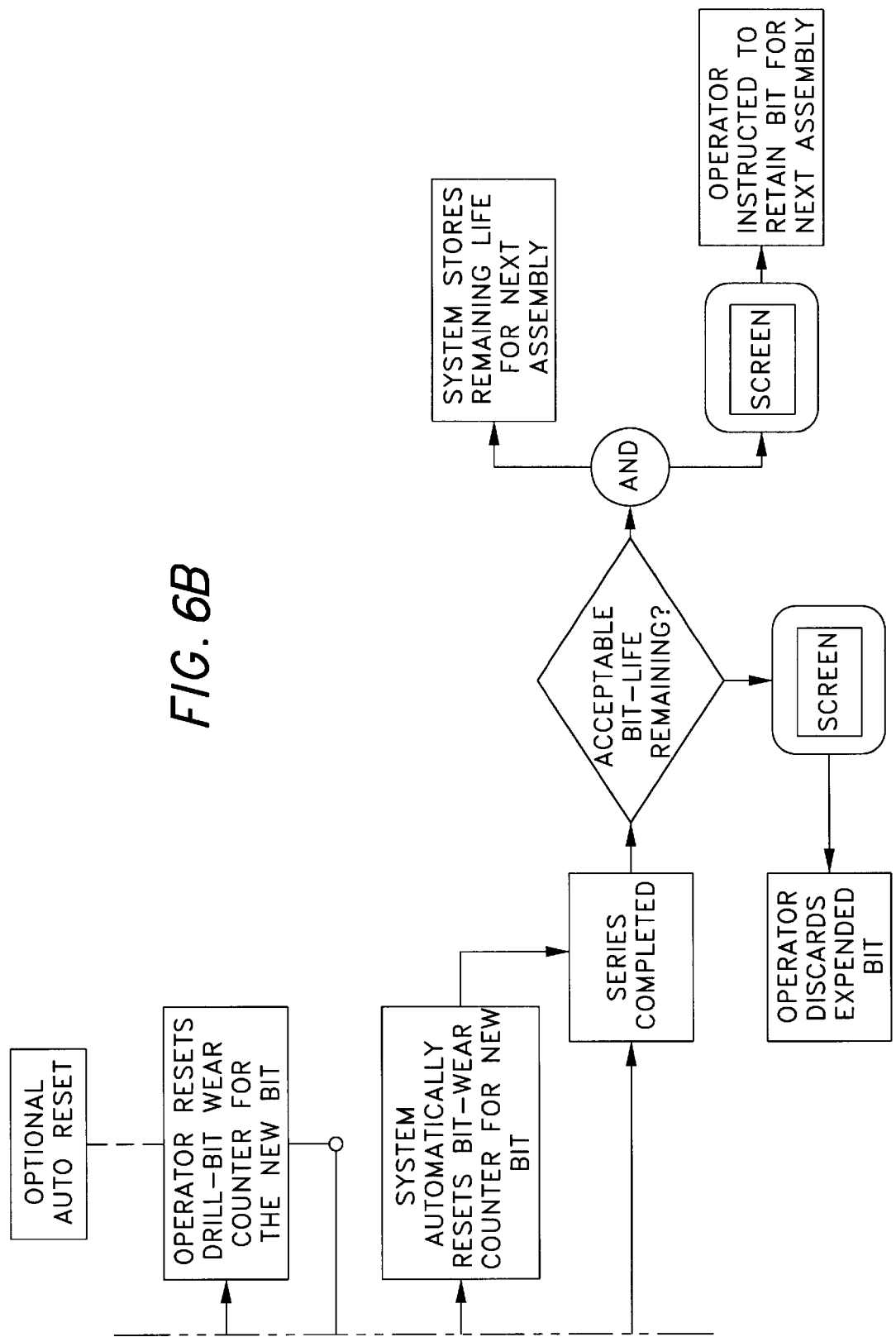

FIG. 6 is a detailed flow diagram of a first sample module of the working example of the interface system of FIG. 3 and of the components of FIG. 5.

Figure 7B:
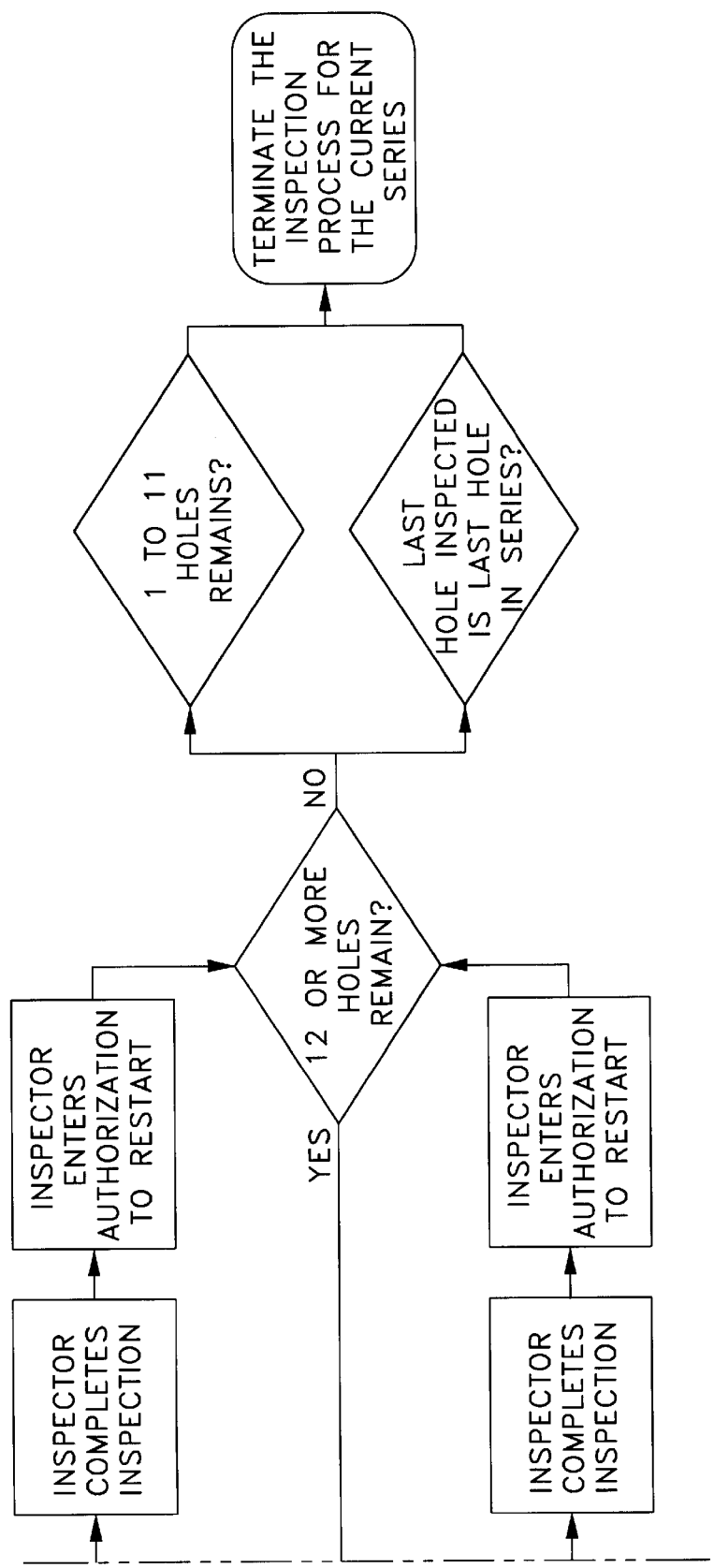
FIG. 7 is a detailed flow diagram of a second sample module of the working example of the interface system of FIG. 3 and of the components of FIG. 5.
Figure 8:
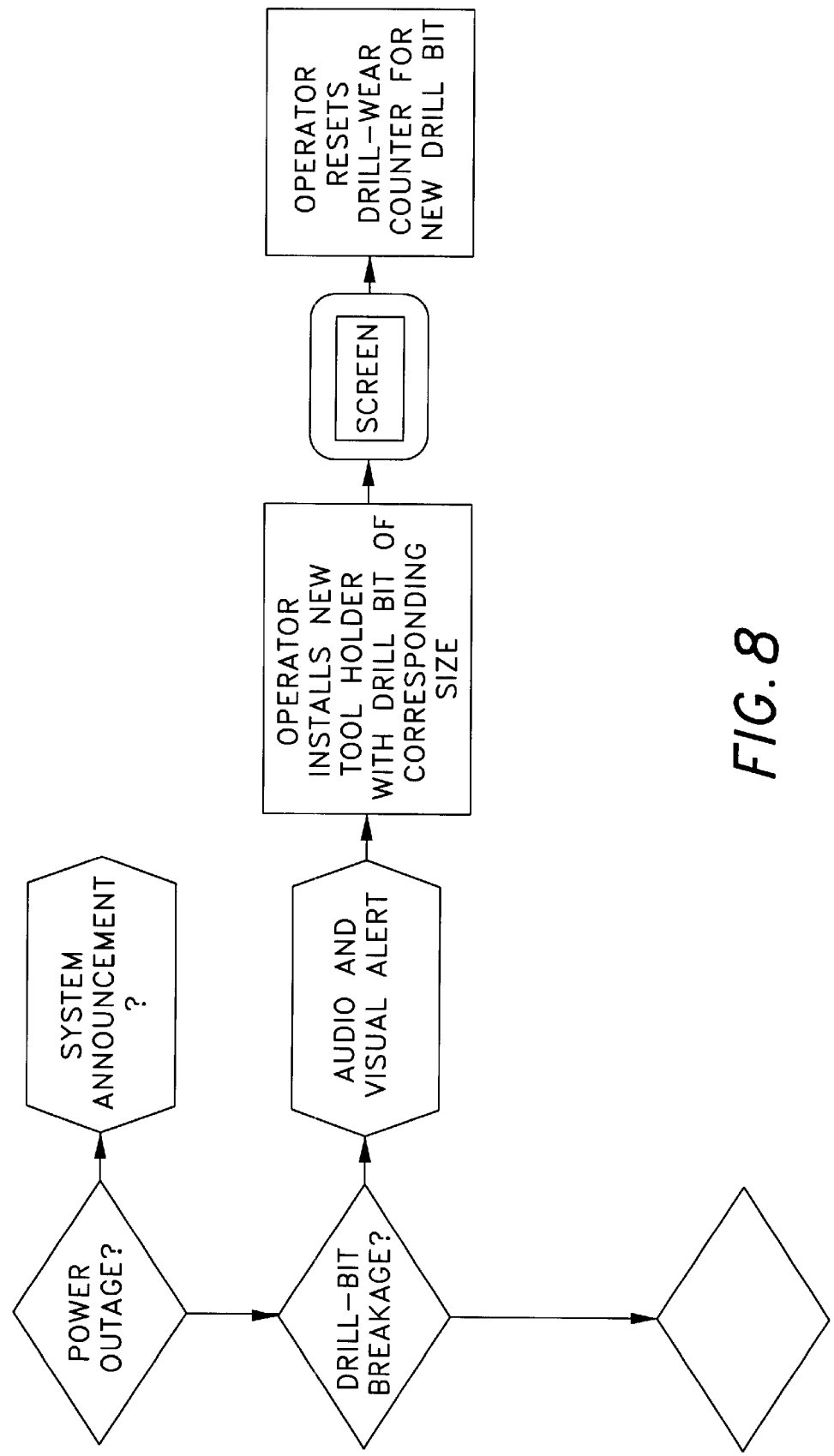
FIG. 8 is a detailed flow diagram of a third sample module of the working example of the interface system of FIG. 3 and of the components of FIG. 5.

The interface system can perform many different series of operations on a given assembly part and FIGS. 6–8 depict only specific sample operations. The first sample module is a module for changing drill tools, as shown in FIG. 6. This module allows the operator to automatically change a tool (for example if the tool breaks or reaches its wear limit and needs to be replaced) of the gantry interactively through the interface system.

In the example of FIG. 6, with regard to changes for differing diameters, drill tools are to be changed at the end of each drilling series when a drill bit of a different diameter is required for the next series. Since all holes of a single diameter are to be drilled in a single drilling sequence, a drill bit of any given size will be used only once for a single assembly operation, for example, the left side of the left vertical stabilizer. If there are, for instance, sixteen different size drill bits required, sixteen different changes for each diameter during each single assembly program. In addition, with regard to changes for wear, drill bits are usually removed and discarded when they have reached or neared the end of their life expectations. Because of the number of holes in the series for some drill bits, it will be necessary to replace the bit in mid-series. Drill bits that have a life expectancy remaining at the end of a drilling series may be retained for reuse when they have the capability to complete a reasonable number of holes in a subsequent assembly.

FIG. 7 is a detailed flow diagram of a second sample module of the working example of the interface system of FIG. 3 and of the components of FIG. 5. The second sample module is a module for conducting hole inspections, as shown in FIG. 7. This module allows the operator to automatically inspect the assembly part interactively through the interface system. FIG. 8 is a detailed flow diagram of a third sample module of the working example of the interface system of FIG. 3 and of the components of FIG. 5. The third sample module is a module for dealing with anomalies, as shown in FIG. 8. This module allows the operator to automatically monitor and control common anomalies, such as power outages, drill bit breakages, etc. interactively through the interface system.

Graphical User Interface

FIGS. 9–14 illustrate sample layouts of the graphical user interface of the working example of the present invention. The interface software can be preprogrammed to allow interactivity with the operator via interactive screen components. Namely, the interface software can be preprogrammed to have graphic displays, status displays, operator instruction displays, graphic keypad displays, and operating button displays.

Screen Components

The graphic displays can include a variety of visual displays, such as special alerts and warnings, illustrations of drill tools to be installed, illustrations of vertical stabilizer components being drilled at any given time, etc. The contents of the display are prescribed in individual screen specifications.

Separate series and assembly status displays can be run for each gantry system (the left and right sides of the stabilizer). The status displays can include, for example, a series-status display and/or an assembly-status display. The series-status display can be a table displaying the operating status at each point in a given drilling sequence. The series-status display can reset at the end of each drilling series. As an example, as shown in TABLE I, the series status can include continuous display during drilling operation and automatic resetting of the display at the beginning of each new drilling series. Also, a database record of series completion rates can be maintained for management analysis and can include, for example, shift identification and operator PIN's.

TABLE I

SERIES STATUS

| Series | Now Drilling: Material | Hole # | Holes in Series | # of Holes Completed | % of Holes Completed | Drill Rate |
|---|---|---|---|---|---|---|
| .1900 | Composite/ Composite | 272 | 8 | 3 | .38% | 4/min |
| Time to Next Inspection | | :15 | | | | |
| Time to Series Completion | | 1:15 | | | | |
| Time to Shift Change | | 7:05 | | | | |

The assembly-status display is a table displaying the operating status for an entire job (each or both assemblies). The assembly-status display can be available on-call in response to operator input. The assembly-status display can reset at the beginning of operation for a new assembly or pair of assemblies. The on-call availability of the assembly-status display can be activated by touch. Similar to the series-status display, a database record of series completion rates can be maintained for management analysis and can include, for example, shift identification and operator PIN's. TABLE II illustrates a sample status display for the stabilizer left-side assemblies.

TABLE II

ASSEMBLY STATUS

| Assembly | Total Holes | Total Holes Completed | % of Holes Completed | Drill Rate |
|---|---|---|---|---|
| LEFT | 566 | 566 | 100% | 3.9/min |
| RIGHT | 566 | 3 | 0.005% | 4.1/min |
| BOTH | 1132 | 569 | 50.2% | 4/min |

The operator instruction displays can have text instructions that are displayed when actions by the operator are required. At times, the operator instruction displays can be accompanied by music and/or visual displays (see above) for allowing operator and inspector tasks to be performed. Preferably, text is accompanied by voice over when music and/or visual displays are used. The graphic keypad displays can include, for example, graphical numeric keypads with touch screen input for allowing the operator to easily input his/her PIN/password and the assembly part number at the beginning of an assembly.

The operating button displays can include a STOP button display and a START button display. The STOP button display is usually required as a safety standard for use only in emergency. The STOP button display can be accompanied by visual and auditory alarms which alert other personnel and/or prompt other personnel to take action. The START button display is a toggle button that allows the operator to temporarily stop and restart drilling operations, e.g., for a break. The START button display is preferably available only during normal drilling operations. Normal restarts following drill changes and inspections are initiated by other input.

Sample Screen Progression

Figure 9:
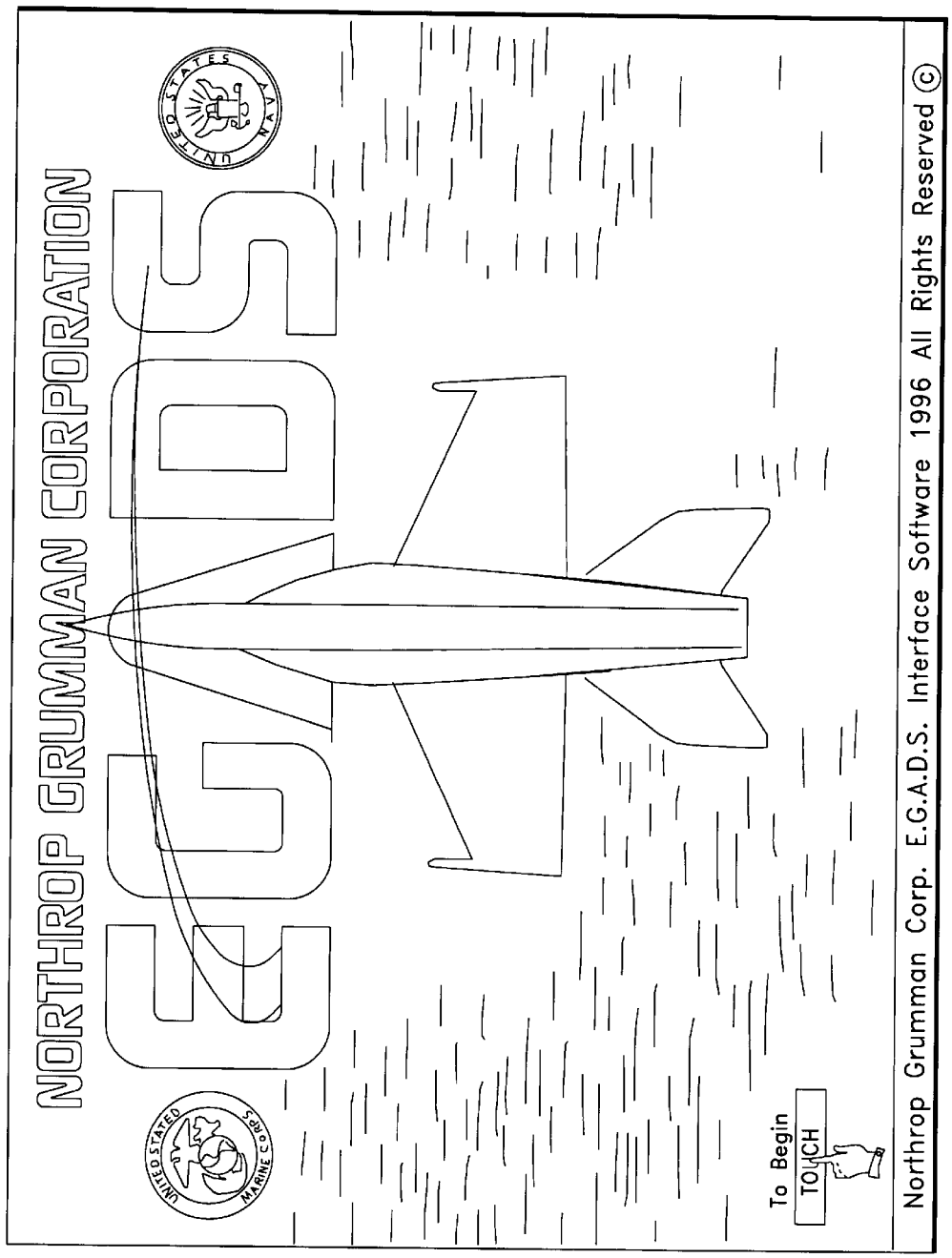
Figure 10:
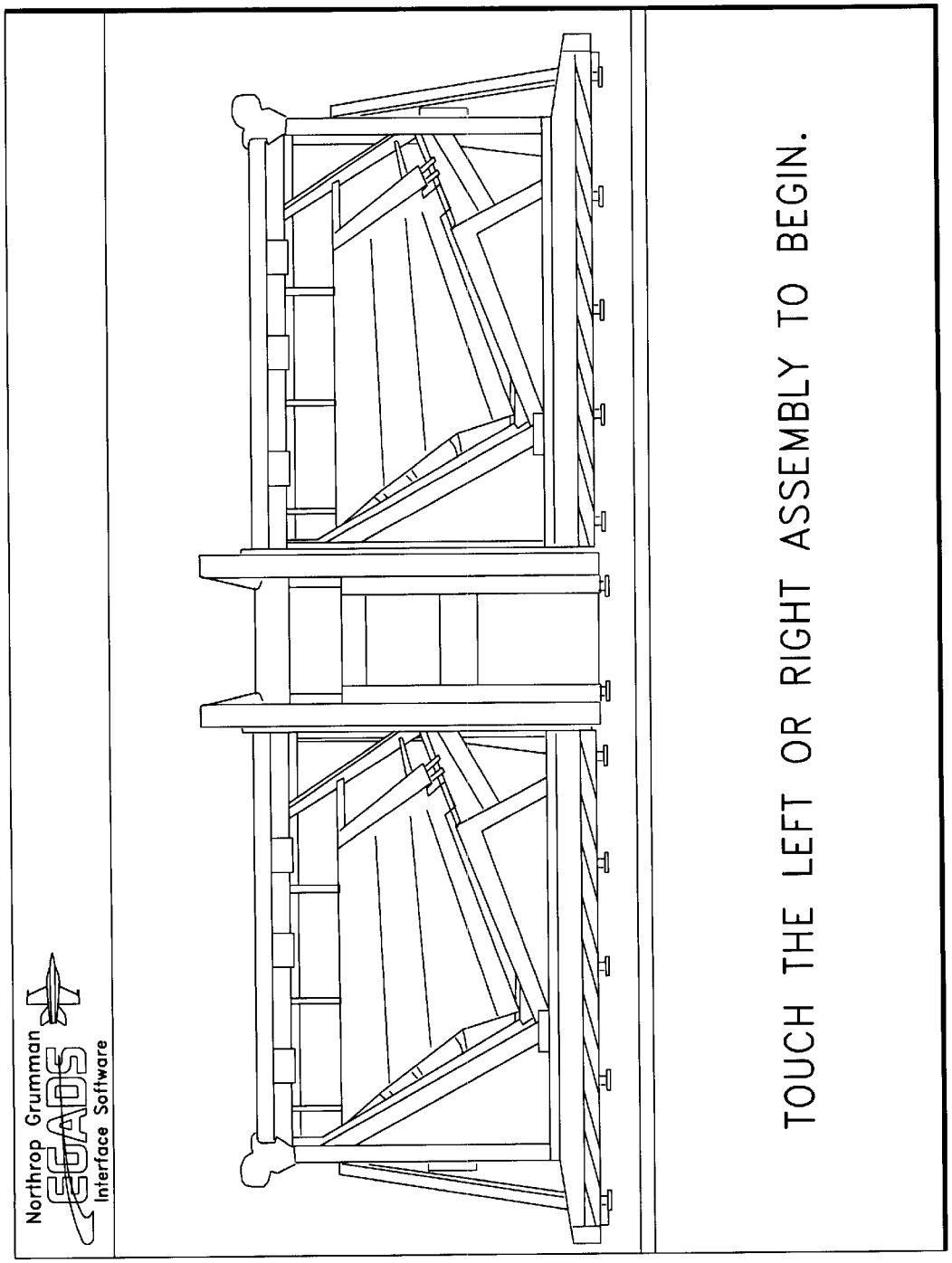

Referring to FIG. 9, first, a main screen (screen #1) is displayed. The main screen (screen #1) can be a screen saver displayed during idle states between assembly drilling sessions. The main screen (screen #1) can be touched to bring up a secondary screen (screen #2) for beginning drilling operations, as shown in FIG. 10. The secondary screen (screen #2) illustrates the right side stabilizer and the left side stabilizer mounted in the assembly jig, as shown in FIG. 10. An option is given for the operator to either choose between the right side assembly or the left side assembly. The secondary screen (screen #2) can be touched to choose the stabilizer to begin assembly drilling operations on the respective stabilizer.

Figure 11:
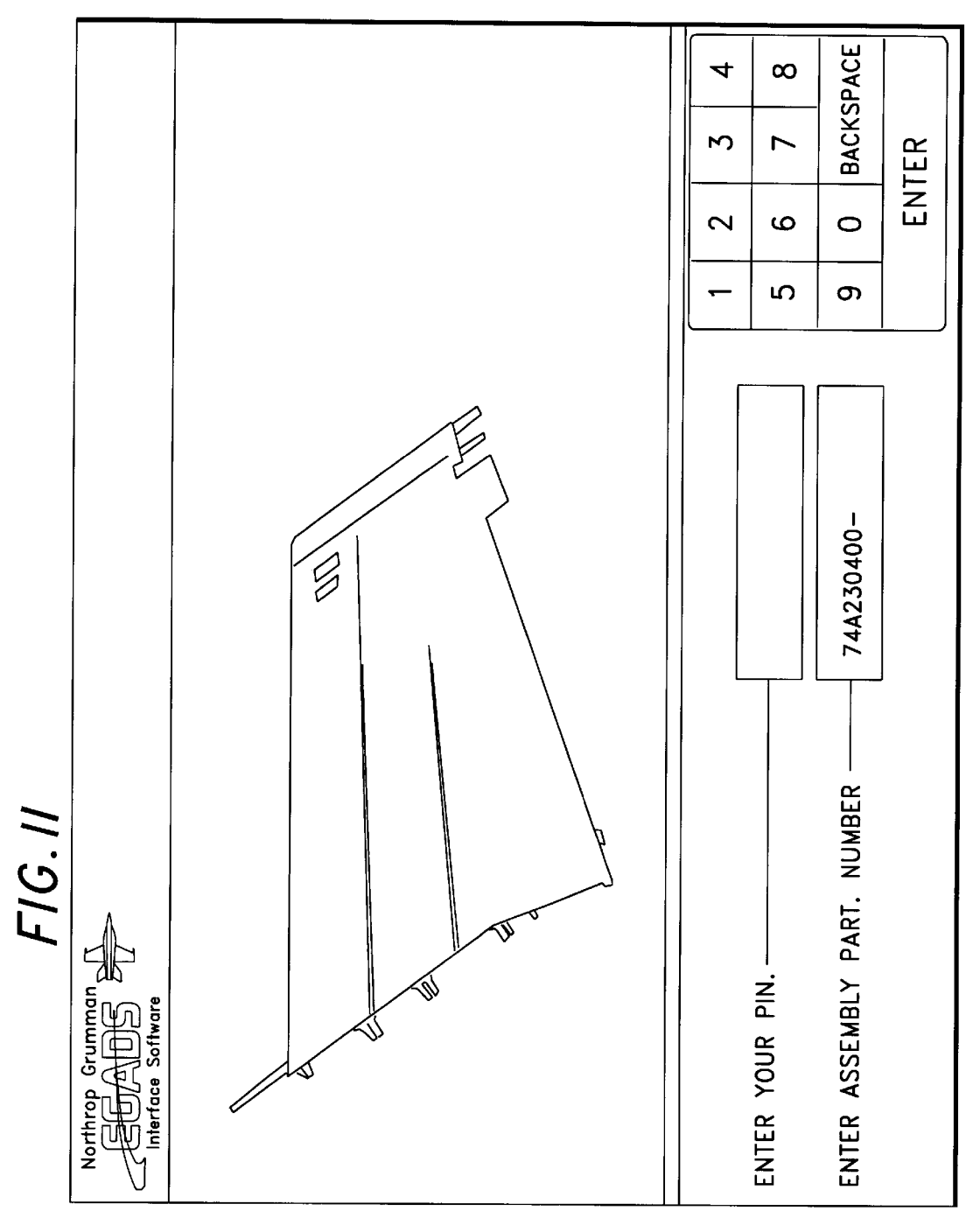
Figure 12:
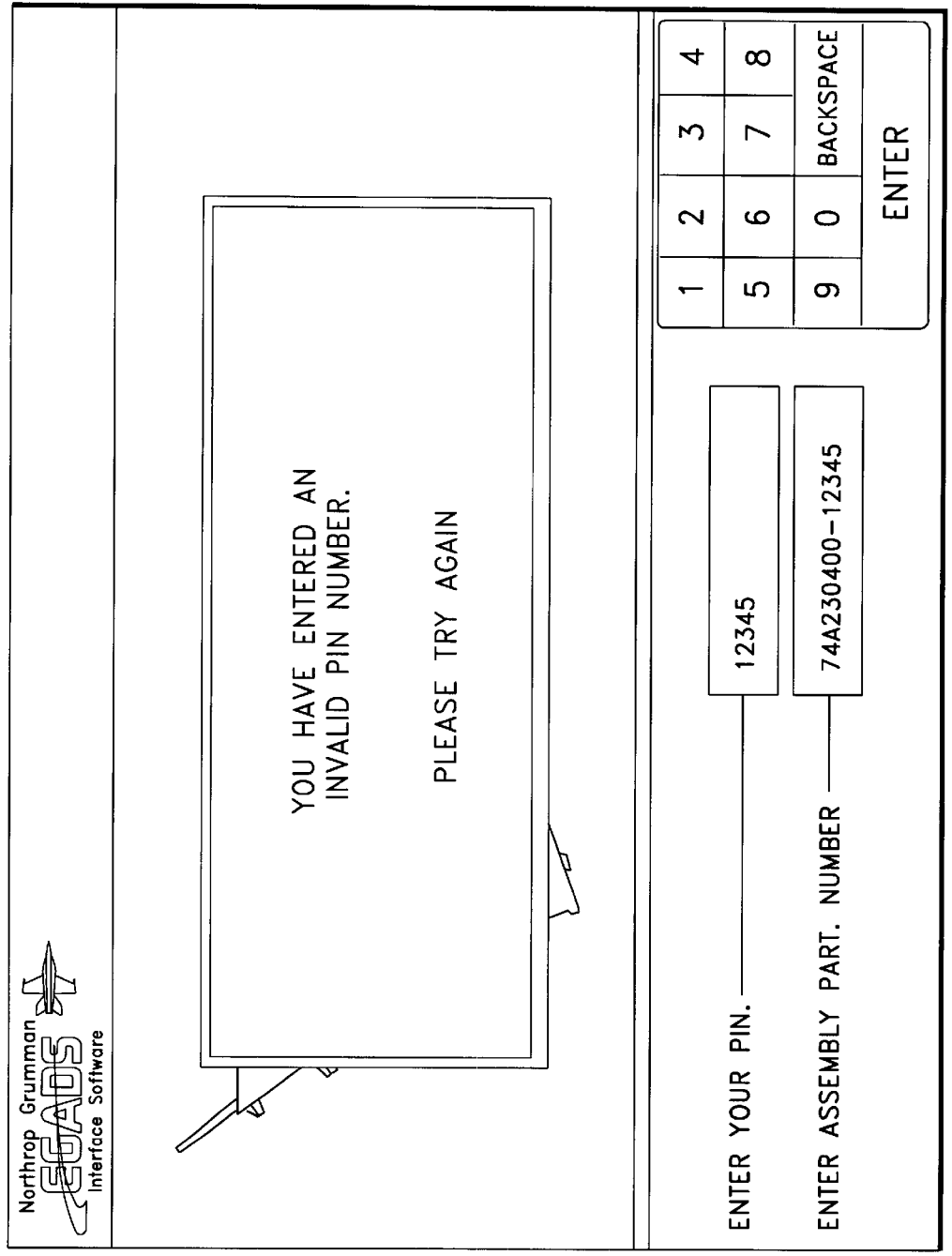

A subsequent screen (screen #3) is displayed which can be an illustration of the assembly selected for drilling along with a requirement for the operator to enter his/her personal identification number (PIN) and the part number of the assembly to be drilled, as shown in FIG. 11. Additional screens (screen #3b, 3c, 3d . . . ) are initiated depending on the assembly selected. Error routines are overlaid if invalid numbers in either category are entered, as shown in FIG. 12. Entry of a valid PIN and an assembly part number prompts presentation of an initial operation screen (screen #4), as shown in FIG. 13.

Figure 13:
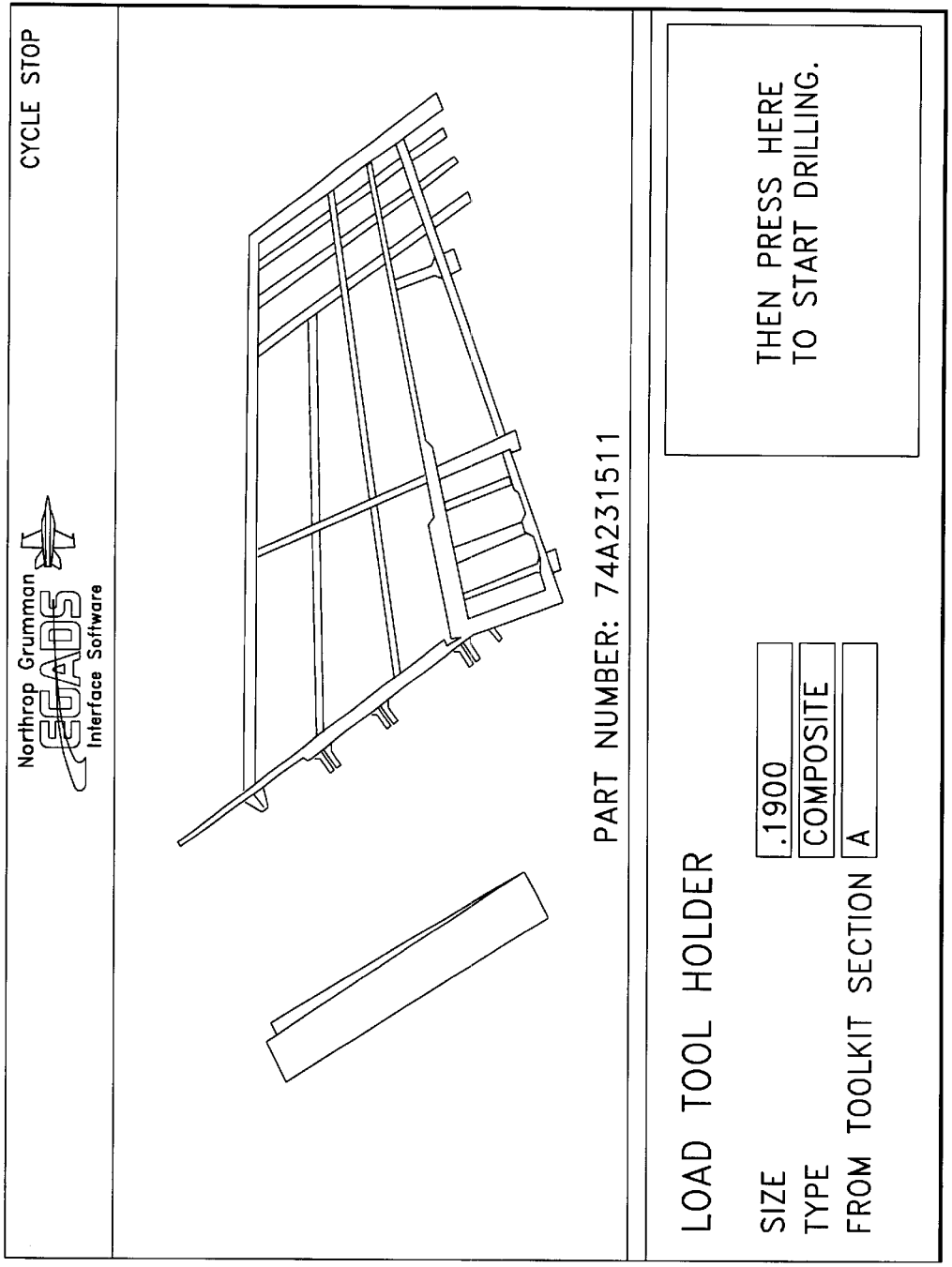

The initial operation screen (screen #4) requires input data from the operator, such as size, type, and from toolkit section information, as shown in FIG. 13, in order to load the tool holder appropriate to the assembly and series to be drilled. The initial operation screen (screen #4) can have an initiate button area on the screen, which when touched, initiates the drilling process. A perform drilling operation screen (screen #5) can have an illustration of the stabilizer frame without the skin in place positioned screen left or screen right depending on the assembly chosen for drilling by the operator, as shown in FIG. 14. Subsequent perform drilling operation screens (screen #5b, 5c, 5d . . . ) are initiated depending on the drilling operation to be performed.

Software animation can bring the frame component (spar or rib) to be drilled into the open screen space which then becomes a dynamic gauge of drilling progress (percent completed). Dynamic on-screen displays can track progress of drilling for the current series and the cumulative status of the entire assembly. The views, overlays, displays, and operator instructions will vary depending on which operating program is involved (for example, left or right stabilizer side), which assembly is being drilled (for example, left or right), and which drilling series is being performed.

Detailed Operation of a Specific Sample Configuration

Figure 15:
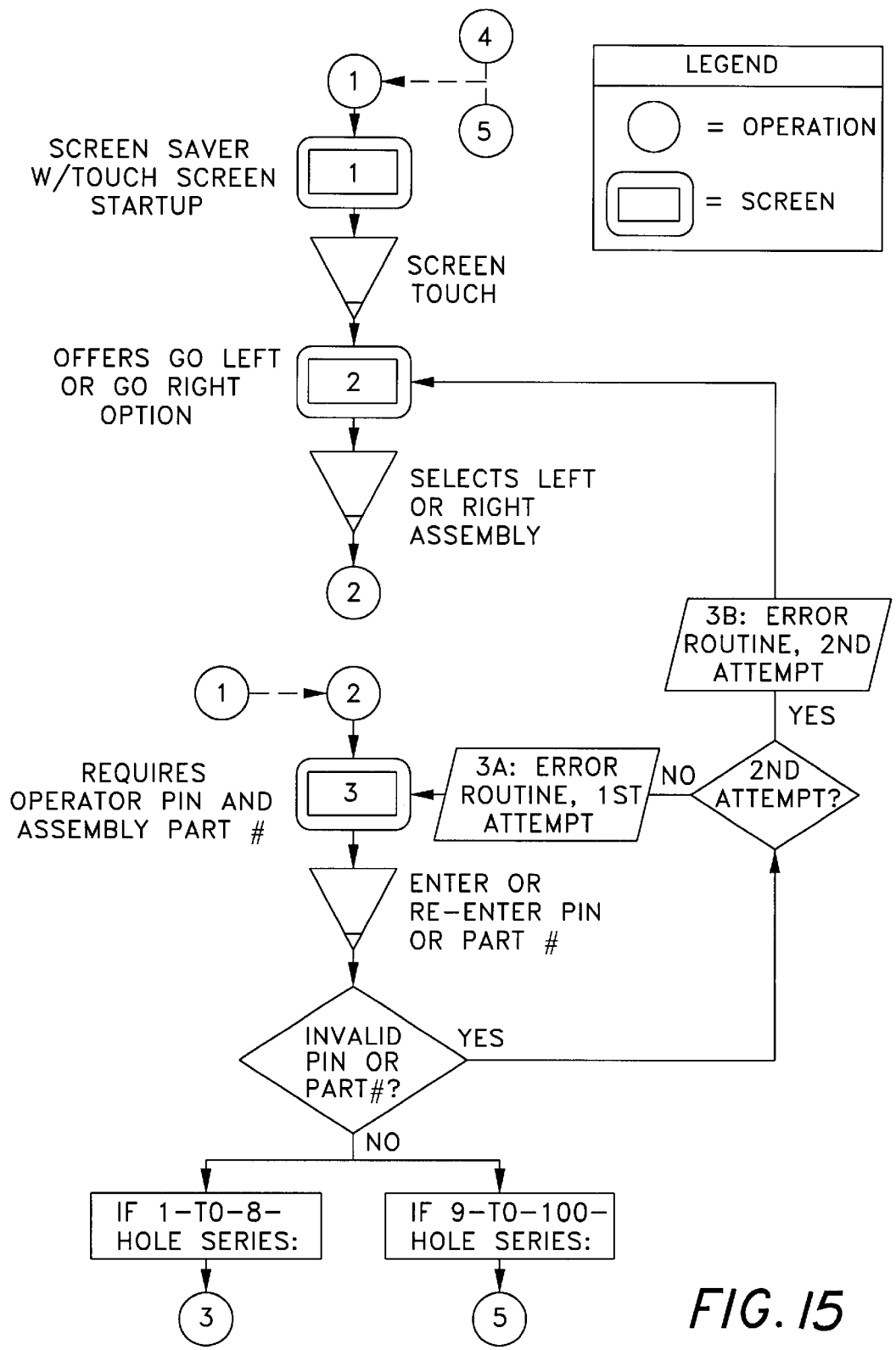
FIGS. 15–17 are flow diagrams illustrating detailed operations of the working example of the interface system of FIG. 3 and of the components of FIG. 5.
Figure 16:
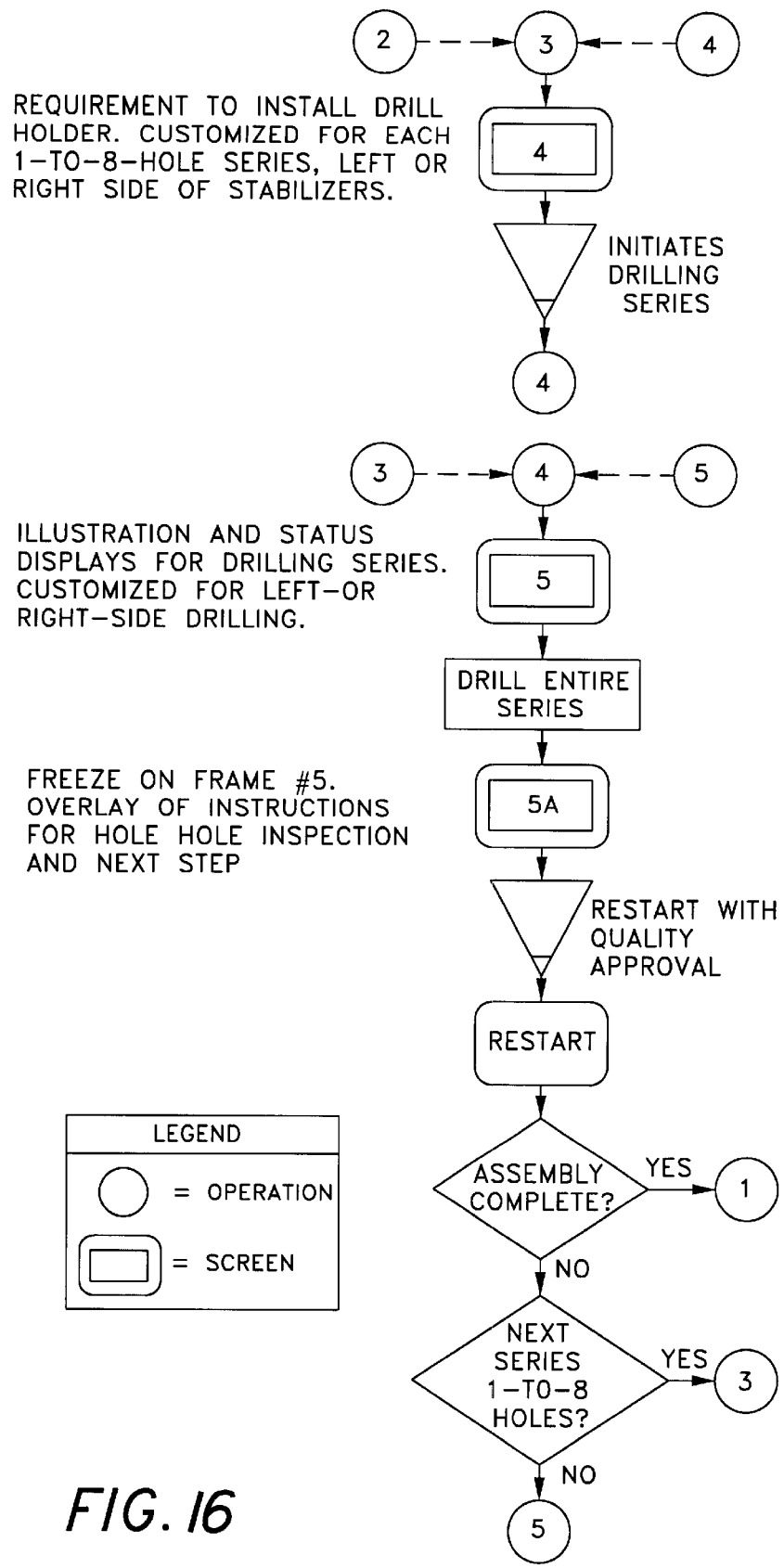
Figure 17B:
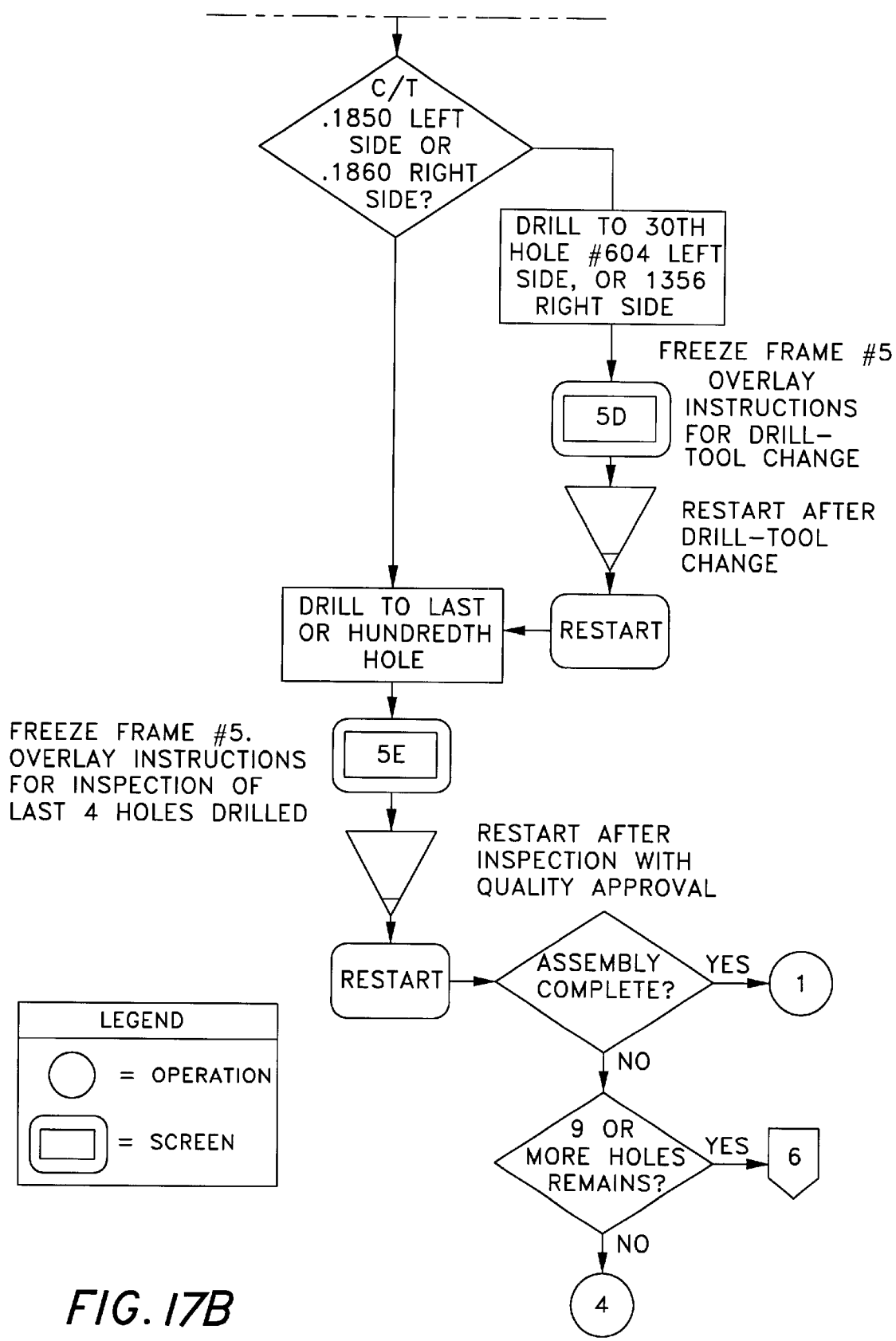

FIGS. 15–17 are flow diagrams illustrating detailed sample operations of the working example of the interface system of FIG. 3 and of the components of FIG. 5. FIG. 15 illustrates operating conditions at the beginning of a new assembly, which in this example can be the left side stabilizer and/or the right side stabilizer, installed in the assembly jig. FIG. 16 illustrates operating conditions during a drilling series, for example, one to eight holes, which in this example can be the left side stabilizer and/or the right side stabilizer, installed in the assembly jig. FIG. 17 illustrates operating conditions during subsequent drilling series, for example, from nine to 100 holes, which in this example can be the left side stabilizer and/or the right side stabilizer, installed in the assembly jig.

Referring to FIGS. 9–14 along with FIGS. 15–17, TABLES III–VII illustrate sample screen functions, content, and specifications during operation of the interface system. It should be noted that all screens need customization for particular assemblies and parts to be handled by the robotic device, and in this example, for each of the stabilizer sides.

TABLE III

| OPERATIONS 1: System Startup | | |
|---|---|---|
| Screen 1 | From: | Initial implementation of the system. Operation 4, Screen 5A, at completion of an assembly at a series of 1 to 8 holes. Operation 5, Screen 5E, at completion of an assembly at a series of 9 to 100 holes. |
| Operating Condition: | | The system is waiting to begin drilling operations for a new assembly. |
| Screen Function: | | Screen-saving. Access to Screen 2 to begin drilling operations. |
| Graphic: | | See illustration presented earlier. |
| User Instructions: | | None |
| User Input: | | Touches 'To Begin Touch' button. |
| Sound: | | Marine or Navy hymns initiated at touch of 'To Begin Touch' button. Split play time between this screen and Screen 2. |
| GOTO: | | Screen 2 |
| Screen 2 | From: | Screen 1, or Screen 3B if operator makes two erroneous PIN or assembly part # entries in a row. |
| Operating Condition: | | Operator has responded to Screen 1, or made an invalid entry at Screen 3B |
| Screen Function: | | Present operator the option to drill the left or the right assembly. |
| Graphic: | | See illustration provided earlier. |
| User Instructions (Text): | | Touch the right or left assembly to begin drilling. |
| Voice Over: | | Touch the right or left assembly to begin drilling operations. |

TABLE III-continued

| OPERATIONS 1: System Startup | |
|---|---|
| Series Status Display: | Not Available |
| Assembly Status Display: | Not Available |
| Active Selections: | Touch sensitive under each assembly illustration (left or right). |
| User Input: | Touches left or right assembly. |
| GOTO | Operation 2, Screen 3 |

TABLE IV

| OPERATION 2: Initiating New Assemblies | | |
|---|---|---|
| Screen 3 | From: | Screen 2, or Screen 3A if first PIN or part # entry is invalid. |
| Operating Condition: | | Operator has elected to begin drilling either the left or right assembly at Screen 2, or made an invalid entry at Screen 3A. |
| Screen Function: | | Validate user as an authorized person. Validate assembly part number and record it in database. Select appropriate beginning drill sequence for the operator's selection of the left or right assembly. Provide access to Operation 3 (1 to 8 holes) or Operation 5 (9 to 100-holes) depending on assembly to be drilled) (System checks validity of PIN and part # as entered.) |
| Graphic: | | See illustration presented earlier. Assembly illustrated will be screen left or screen right, depending on the operator selection @ screen 2. |
| User Instructions (Text:) | | Enter your PIN and press ENTER Enter the assembly part number and press ENTER. |
| Voice Over: | | Enter your Personal Identification Number and press ENTER. Then enter the stabilizer part number and press ENTER. |
| Series Status Display: | | Not available. |
| Assembly Status Display: | | Not available. |
| Active Selections: | | Keypad |
| User Input: | | Enters PIN and assembly part number. |
| GOTO: | | Screen 3A if invalid PIN or part number. Screen 4, Operation 3, if valid PIN and part number and drilling series is to be 1 to 8 holes. Screen 4, Operation 5, if valid PIN and part number and drilling series is to be 9 to 100 holes. |
| Screen 3A | | From: Screen 3 |
| Operating Condition: | | User has entered invalid PIN or assembly part number at Screen 3. |
| Screen Function: | | Error routine for invalid PIN or assembly part number on first attempt @ Screen 3. |
| Graphics: | | Continue Frame 3; overlay error-routine instructions. |
| User Instructions: | | You have entered an invalid PIN (or assembly part number). Please reenter a valid number. |
| Voice Over: | | That is an invalid <PIN> or <assembly part number>. Please reenter a valid number. |
| Series Status Display: | | Not available |
| Assembly Status Display: | | Not available |
| Active Selections: | | Keypad, all keys |
| User Input: | | Enters PIN or assembly part number |
| GOTO: | | Screen 3B if second Pin or assembly part number entry is invalid. |

TABLE IV-continued

OPERATION 2: Initiating New Assemblies

|  |  |
|---|---|
|  | Operator 3, screen 4 if re-entry is valid and next series is 1 to 8 holes. Operation 5, screen 4 if re-entry is valid and next series is 9 to 100 holes. |
| Screen 3B | From: Screen 3A |
| Operating Condition: | Operator has entered an invalid PIN or assembly part number a second time. |
| Screen Function: | Error routine for invalid PIN or assembly part number on second attempt @ Screen 3A. |
| Graphic: | Return to Screen 2. Overlay operator instructions. |
| User Instructions: | (Over Screen 2) You have entered another invalid number. |
| Voice Over: | Let's start over. Make sure you use <your employee number>) OR <the correct part number>. Get assistance from you supervisor if you need help. |
| Series Status Display: | Not available |
| Assembly Status Display: | Not available |
| Active Selections: | Numeric keypad, all keys |
| User Input: | Same as Screen 2. |
| GOTO: | Screen 2 |

TABLE V

OPERATION 3: Installing Drill Holders, Any Series, Left or Right Stabilizer Side

| | |
|---|---|
| Screen 4 | From: Screen 3 or 3A |
| Operating Condition: | Operator has successfully entered PIN and assembly part number for the assembly to be drilled. |
| Screen Function: | Instruct operator to install appropriate drill holder and begin drilling the appropriate series. |
| Drilling Series: | Variable. See: Tables on flowchart for Operation 3 or 5P DRILL SERIES following these screen specifications Appendix A, Drill Usage Appendix B, Drilling Sequences |
| Graphics: | See illustration provide earlier. |
| User Instructions (Text): | Install the tool holder you see here. Press START to begin drilling. Overlay appropriate drill-bit size (diameter). Overlay drill-bit type: polycrystalline diamond for C/C, carbide titanium for C/A, C/T, or C/A/T |
| Voice Over: | Install this tool holder. Please make sure that the Tool Holder is secured tightly. Please make sure that all personnel are clear of the robot before starting. Then press START when you are ready to begin drilling. |
| Series Status Display: | Not available |
| Assembly Status Display: | Not available |
| Active Selections: | START button |
| User Input: | Presses START |
| GOTO | Screen 5 |

TABLE VI

OPERATION 4: Drilling Series of 1 to 8 Holes, Left or Right Stabilizer Side

| | |
|---|---|
| Screen 5 | From: Screen 4, Installing Drill Holders |
| Operating Condition: | Operator has installed tool holder for appropriate series of 1 to 8 holes and pressed START to begin the drilling operation. |
| Screen Function: | Illustrate progress of the appropriate 1-to-8-hole drilling series. Provide operator ability to stop for breaks and restart drilling when ready. |

TABLE VI-continued

OPERATION 4: Drilling Series of 1 to 8 Holes, Left or Right Stabilizer Side

| | |
|---|---|
| Graphics Window: | Illustration of assembly frame for left or right stabilizer side positioned screen left or right depending on assembly selected at screen 2. Animation of frame component(s) being drilled flows out of frame into blank screen area and becomes a dynamic gauge of assembly status (% of drilling completed). |
| User Instructions (Text): | None |
| Voice Over: | None |
| Series Status Display: | Active and dynamic at screen initiation |
| Assembly Status Display: | Active and dynamic at screen initiation |
| Active Selections: | Cycle Stop/Start |
| User Input: | Presses Cycle Stop/Start for break. Otherwise, none. |
| GOTO: | Screen 5A (hole inspection). |
| Screen 5A | From: Screen 4, any 1-to-8 hole series, left or right stabilizer side. |
| Operating Condition: | All holes in series of 1 to 8 holes have been drilled. |
| Screen Function: | Initiate inspection of all holes in the series. Provide START to proceed to next drilling series or to idle (Screen 2) if assembly completed. |
| Graphics Window: | Freeze on Screen 5. Overlay instructions for hole inspection. |
| User Instructions (Text): | Have quality assurance inspect holes <hole numbers appropriate to the series drilled>. Press START when you get authorization to proceed. |
| Voice Over: | Have quality assurance inspect the boles just drilled. Please make sure that all personnel are clear of the robot before starting. Press START to continue when you receive authorization. |
| Series Status Display: | Freeze on Screen 5 Status. Zero out when START pressed. |
| Assembly Status Display: | Freeze on Screen 5 Status. Zero out when START pressed if this is the last series of the assembly. |
| Active Selections: | START button |
| User Input: | Presses START |
| GOTO: | Operation 1, Screen 1 if assembly complete. Operation 3, Screen 4 if assembly not complete and next series is 1 to 8 holes. Operation 5, Screen 4 if assembly incomplete and next series is 9 to 100 holes. |

TABLE VII

OPERATION 5: Drilling Series of 9 to 100 Holes, Left or Right Stabilizer Side

| | |
|---|---|
| Screen 5 | From: Screen 4, Installing Drill Holders |
| Operating Condition: | Operator has installed tool holder for appropriate series of 9 to 100 holes and pressed START to begin the drilling operation. |
| Screen Function: | Illustrate progress of the appropriate 9-to-100-hole drilling series. Provide operator ability to stop for breaks and restart drilling when ready |
| Graphics Window: | Illustration of assembly frame for left or right stabilizer side positioned screen left or right depending on assembly selected at screen 2. Animation of frame component(s) being drilled flows out of frame into blank screen area and becomes a dynamic gauge of assembly status (% of series drilling completed). |
| User Instructions (Text): | None |
| Voice Over: | None |
| User Input: | Not available |
| Series Status Display: | Active and dynamic at screen initiation |
| Assembly Status | Active and dynamic at screen initiation |

TABLE VII-continued

OPERATION 5: Drilling Series of 9 to 100 Holes, Left or Right Stabilizer Side

| | |
|---|---|
| Display: | |
| Active Selections: | Cycle Stop/Start |
| User Input: | Presses Cycle Stop/Start for break. Otherwise, none. |
| GOTO: | Screen 5B (hole inspection). |
| Screen 5B | From: Screen 4, any 9-to-100-holes series, left or right stabilizer side. |
| Operating Condition: | First 4 holes of 9-to-100-hole series have been drilled |
| Screen Function: | Initiate inspection of first 4 holes in the series. Provide START to resume the drilling process. |
| Graphics Window: | Freeze on Screen 5. Overlay instructions for hole inspection. |
| User Instructions (Text): | Have quality assurance inspect holes <hole numbers appropriate to the series drilled>. Press START when you get authorization to proceed. |
| Voice Over: | Have quality assurance inspect the holes just drilled. Please make sure that all personnel are clear of the robot before starting. Press START to continue when you receive authorization. |
| Series Status Display | Freeze on Screen 5 Status. Resume when START pressed. |
| Assembly Status Display | Freeze on Screen 5 Status. Resume when START pressed. |
| Active Selections: | START button |
| User Input: | Presses START |
| GOTO: | Screen 5C |
| Screen 5C | From: Screen 5B, 9-to-100 hole series |
| Operating Condition: | QA person has given authorization to proceed after inspection first 4 holes in series. |
| Screen Function: | Continue drilling series and resume dynamic display of drilling operation from Screen 5B, 9-to-100-hole series |
| Graphics Window: | Continuation of Screen 5, 9-to-100-hole series. |
| User Instructions (Text): | None |
| Voice Over: | None |
| Series Status Display: | Continue from Screen 5B, 9-to-100-hole series. |
| Assembly Status Display: | Continue from Screen 5B, 9-to-100-hole series. |
| Active Selections: | Cycle Stop/Start |
| User Input: | Presses Cycle Stop/Start for break. Otherwise, none. |
| GOTO: | Screen 5D if drilling C/T .1850, left stabilizer side. Screen 5E if not. |
| Screen 5D | From: Screen 5C |
| Operating Condition: | E.G.A.D.S. is drilling C/T .1850 holes for left or right stabilizer side (hole # 605 left side; hole # 1357 right side. |
| Screen Function: | Branch to drill-bit change for this series. |
| Graphics Window: | Freeze Screen 5c for 9-to-100-hole series. Overlay text instructions for drill-tool change. |
| User Instructions (Text): | Install the tool holder you see here. <Same as in Screen 4, 9-to-100-hole series, for C/T .1850> for the left or right stabilizer side. Press START to continue drilling. |
| Voice Over: | Install the second tool holder of this size and type. Please make sure that the Tool Holder is secured tightly. Then press START when you are ready to begin drilling. |
| Series Status Display: | Not available |
| Assembly Status Display: | Not available |
| User Input: | Presses START |
| Active Selections: | START button |
| GOTO | Screen 5E |
| Screen 5E | From: Screen 5C or 5D |
| Operating Condition: | E.G.A.D.S. has completed drilling the last or the X00th hole of any 9-to-100-hole series for the stabilizer left or right side. |
| Screen Function: | Initiate inspection of last 4 of 100 holes, or the last 4 or fewer holes of a series balance of less than 100 holes, and, Provide restart to: complete present series (as a new series), or drill next assembly series (1 to 8, or 9 to 100), or recycle to Operation 1 for idle until next assembly operation. |
| Graphics Window: | Freeze Screen 5C or 5D. Overlay text instructions for hole inspections. |
| User Instructions (Text): | Have quality assurance inspect holes <hole numbers appropriate to the series drilled>. Press START when you get authorization to proceed. |
| Voice Over: | Have quality assurance inspect the holes just drilled. Please make sure that all personnel are clear of the robot before starting. Press START to continue when you get authorization. |
| Voice Over 2: | (only played if present series is complete and the robot is about to return to the home position) Have quality assurance inspect the holes just drilled. The robot is about to return home. Please make sure the home area is clear of personnel. Press START to return the robot to the home position when you get authorization from quality assurance to proceed. |
| Series Status Display: | Freeze on Screen 5C or 5D Series Status if additional holes remain to be drilled beyond the X00th hole. Zero out Series Status if series has been completed. |
| Assembly Status Display: | Freeze on Screen 5C or 5D Assembly Status if additional holes remain to be drilled in present series, or additional series remain to be drilled in the assembly. Zero out Assembly Status if assembly is complete. |
| Active Selections: | START button |
| User Input: | Presses START |
| GOTO | Operation 5, Screen 4, if 9 or more holes remain to be drilled in present series. Operation 5, Screen 4, if series is complete, assembly is incomplete, and the next series is 9 to 100 holes. Operation 3, Screen 4, if 1 to 8 holes remain in present series. Operation 3, Screen 4, if series is complete, assembly is incomplete, and the next series is 1 to 8 holes. Operation 1, Screen 1, if both series and assembly are complete. |

\* The Cycle Stop/Start button is preferably available during active drilling operations. Screen dynamics freeze when STOP is selected and resume when START is selected. The button's use is to be limited to operator initiated breaks during a drilling series.

Finally, specific specification requirements for particular gantry operations, such as drilling holes in the right and left stabilizer sides, are preprogrammed into the interface system for automatic operation. These specification requirements can include the series numbers, bit diameters, hole numbers, number of holes in the series, the holes to be inspected, etc.

The foregoing description of the preferred embodiment of the invention has been presented for the purposes of illustration and description. It is not intended to be exhaustive or to limit the invention to the precise form disclosed. Many modifications and variations are possible in light of the above teaching. For example, this multi-media interface system can have additional integrated animation, video, audio, text, hypertext and graphics to aid the operator in operating a robotic device. It is intended that the scope of the invention be limited not by this detailed description, but rather by the claims appended thereto.

What is claimed is:

1. A computer implemented method for interfacing an operator with a robotic system, comprising the steps of:
    (a) providing an interactive computer environment with interface software operating thereon;
    (b) processing engineering data stored on a computer memory by said interface software, wherein said engineering data contains operating information relating to the robotic system;
    (c) interfacing the operator with said interactive computer environment with a graphical user interface;
    (d) displaying a menu of said graphical user interface with at least one interface module having preprogrammed sensory media associated with actual robotic events of the robotic system;
    (e) operating, controlling, and monitoring the robotic system interactively in real-time by said operator through said preprogrammed sensory media of at least one interface module;
    (f) performing continuous motion control interaction of the robotic system instantaneously and performing specific tasks and operations associated with the robotic system by said engineering data processed by said interface software; and
    (g) adjusting control of the robotic system automatically in real-time by said interface software in response to predetermined varying conditions surrounding and affecting motion and control of said robot system and controls from said operator.

2. The method of claim 1, wherein said step (d) further comprises:
    (d1) displaying a login menu of said graphical user interface for requiring the operator to login to said interactive computer environment in order to obtain usable access of said interactive computer environment.

3. The method of claim 2, wherein said step (d1) further comprises:
    requiring the operator to login to said interactive computer environment with an identifying login name and password.

4. The method of claim 1, wherein said step (d) further comprises:
    (d1) displaying a main menu of said graphical user interface for allowing the operator to select one of a plurality of operating series, each operating series having a submenu and being associated with an actual operation event of the robotic system.

5. The method of claim 1, wherein said step (g) further comprises:
    (g1) performing an operator login for requiring the operator to login to said interactive computer environment in order to obtain usable access of said interactive computer environment;
    (g2) performing idle operations for providing management and coordination of idle states of the robotic system and said interactive computer environment;
    (g3) performing robotic system operations for providing management of movements and control operations of the robotic system; and
    (g4) performing completion operations for providing general management, control and monitoring of the robotic system.

6. The method of claim 1 wherein step (d) further comprises displaying a text window for providing textual information and operator selectable hypertext and a graphical window for providing graphical information and operator selectable hypergraphics associated with actual events of an external environment outside said computer environment.

7. The method of claim 1 further comprising linking said computer memory of said interactive computer environment with a remote station for monitoring and supervising said operator in real time, wherein said remote station shares access to and exchanges data with said computer memory.

8. The method of claim 1 further comprising providing training software operating on said interactive computer environment for training said operator, wherein said training software shares access to and exchange of data with said computer memory.

9. The method of claim 8 wherein said step of providing training software further comprises providing an operator selectable simulation training module for viewing a preprogrammed simulation of training operations.

10. The method of claim 9 wherein said step of providing an operator selectable simulation training module further comprises displaying a preprogrammed animated sequence of steps replicating actual steps of said training operation in a graphical window.

11. The method of claim 1 wherein the step (d) further comprises displaying a preprogrammed animated sequence of steps replicating actual specific tasks and operations to be performed by the robotic system in a graphical window.

12. The method of claim 1 wherein the step (d) further comprises displaying a preprogrammed video sequence of steps replicating actual specific tasks and operations to be performed by the robotic system in a graphical window.

13. The method of claim 1 wherein the step (d) further comprises displaying error modules prompted by preprogrammed events occurring associated with operator error input.

14. An interface system for interactively operating and controlling a robotic system by an operator, comprising:
    an interactive computer environment having:
        interface software operating on the interactive computer environment and having engineering data stored on a computer memory and containing operating information relating to the robotic system, said interface software being adapted to automatically adjust control of the robotic system in real-time in response to predetermined varying conditions surrounding and affecting motion and control of the robotic system and controls from said operator in response to the engineering data; and
        a graphical user interface for interfacing said operator with said computer environment, said graphical user interface having a menu with at least one interface module with preprogrammed sensory media associated with robotic events of said robotic system, said sensory media operative to provide said operator with instantaneous continuous motion control interaction of the robotic system and specific tasks and operations associated with the robotic system.

15. The interface system of claim 14, further comprising:
    a login menu of said graphical user interface for requiring the operator to login to said interactive computer environment in order to obtain usable access of said interactive computer environment.

16. The interface system of claim 14, further comprising:
    a login menu of said graphical user interface requiring the operator to login to said interactive computer environment with an identifying login name and password.

17. The interface system of claim 14, further comprising:
a main menu of said graphical user interface for allowing the operator to select one of a plurality of operating series, each operating series having a submenu and being associated with an actual operation event of the robotic system.

18. The interface system of claim 14, further comprising:
an operator login menu for requiring the operator to login to said interactive computer environment in order to obtain usable access of said interactive computer environment;
idle operation menus for providing management and coordination of idle states of the robotic system and said interactive computer environment;
robotic system operation menus for providing management of movements and control operations of the robotic system; and
completion operation menus for providing general management, control and monitoring of the robotic system.

19. The interface system of claim 14, further comprising a text window for providing textual information and operator selectable hypertext and a graphical window for providing graphical information and operator selectable hypergraphics associated with actual events of an external environment outside said computer environment.

20. The interface system of claim 14, further comprising a link from said computer memory of said interactive computer environment to a remote station for monitoring and supervising said operator in real time, wherein said remote station shares access to and exchanges data with said computer memory.

21. The interface system of claim 14, further comprising training software operating on said interactive computer environment for training said operator, wherein said training software shares access to and exchange of data with said computer memory.

22. The interface system of claim 21, wherein said training software further comprises an operator selectable simulation training module for viewing a preprogrammed simulation of training operations.

23. The interface system of claim 22, wherein said operator selectable simulation training module further comprises a preprogrammed animated sequence of steps replicating actual steps of said training operation in a graphical window.

24. The interface system of claim 14, further comprising a preprogrammed animated sequence of steps replicating actual specific tasks and operations to be performed by the robotic system in a graphical window.

25. The interface system of claim 14, further comprising a preprogrammed video sequence of steps replicating actual specific tasks and operations to be performed by the robotic system in a graphical window.

26. The interface system of claim 14, further comprising error modules prompted by preprogrammed events occurring associated with operator error input.

27. A computer-readable medium for causing an interactive computer to function as an interface system for interactively operating and controlling a robotic system by an operator, comprising:
a computer-readable storage medium; and
a computer program stored on said storage medium, said computer program preprogrammed to process engineering data stored on a computer memory and having operation information relating to the robotic system, said computer program adapted to access in real-time a database containing preprogrammed sensory media associated with said engineering data and actual robotic events of the robotic system;
said computer program being preprogrammed to automatically adjust control of the robotic system in real-time in response to predetermined varying conditions surrounding and affecting motion and control of the robot system and controls from said operator and in response to the engineering data;
said computer program having a graphical user interface module for interfacing said operator with said computer program and said sensory media, said graphical user interface module including a menu with interface modules associated with said preprogrammed sensory media;
said preprogrammed sensory media being adapted to interface said operator with said robotic system to interactively operate and control said robotic system in real-time and to instantaneously perform continuous motion control interaction of the robotic system and to perform specific tasks and operations associated with the robotic system.

28. The computer-readable medium of claim 27, further comprising:
a login menu of said graphical user interface for requiring the operator to login to said interactive computer environment in order to obtain usable access of said interactive computer environment.

29. The computer-readable medium of claim 27, further comprising:
a login menu of said graphical user interface requiring the operator to login to said interactive computer environment with an identifying login name and password.

30. The computer-readable medium of claim 27, further comprising:
a main menu of said graphical user interface for allowing the operator to select one of a plurality of operating series, each operating series having a submenu and being associated with an actual operation event of the robotic system.

31. The computer-readable medium of claim 27, further comprising:
an operator login menu for requiring the operator to login to said interactive computer environment in order to obtain usable access of said interactive computer environment;
idle operation menus for providing management and coordination of idle states of the robotic system and said interactive computer environment;
robotic system operation menus for providing management of movements and control operations of the robotic system; and
completion operation menus for providing general management, control and monitoring of the robotic system.

32. The computer-readable medium of claim 27, further comprising a text window for providing textual information and operator selectable hypertext and a graphical window for providing graphical information and operator selectable hypergraphics associated with actual events of an external environment outside said computer environment.

33. The computer-readable medium of claim 27, further comprising a link from said computer memory of said interactive computer environment to a remote station for monitoring and supervising said operator in real time, wherein said remote station shares access to and exchanges data with said computer memory.

34. The computer-readable medium of claim 27, further comprising training software operating on said interactive computer environment for training said operator, wherein said training software shares access and exchange of data with said computer memory.

35. The computer-readable medium of claim 34, wherein said training software further comprises an operator selectable simulation training module for viewing a preprogrammed simulation of training operations.

36. The computer-readable medium of claim 35, wherein said operator selectable simulation training module further comprises a preprogrammed animated sequence of steps replicating actual steps of said training operation in a graphical window.

37. The computer-readable medium of claim 27, further comprising a preprogrammed animated sequence of steps replicating actual specific tasks and operations to be performed by the robotic system in a graphical window.

38. The computer-readable medium of claim 27, further comprising a preprogrammed video sequence of steps replicating actual specific tasks and operations to be performed by the robotic system in a graphical window.

39. The computer-readable medium of claim 27, further comprising error modules prompted by preprogrammed events occurring associated with operator error input.

* * * * *